(12) United States Patent
Zhang et al.

(10) Patent No.: US 12,220,879 B2
(45) Date of Patent: Feb. 11, 2025

(54) LIGHTWEIGHT THERMOPLASTIC COMPOSITE PRODUCTS AND METHODS OF MAKING SAME

(71) Applicant: JOHNS MANVILLE, Denver, CO (US)

(72) Inventors: Mingfu Zhang, Englewood, CO (US); Jieyu Hu, Littleton, CO (US); Lance Wang, Parker, CO (US); Jawed Asrar, Englewood, CO (US)

(73) Assignee: Johns Manville, Denver, CO (US)

( * ) Notice: Subject to any disclaimer, the term of this patent is extended or adjusted under 35 U.S.C. 154(b) by 177 days.

(21) Appl. No.: 17/173,370

(22) Filed: Feb. 11, 2021

(65) Prior Publication Data

US 2022/0250335 A1 Aug. 11, 2022

(51) Int. Cl.
| | |
|---|---|
| *B29C 70/02* | (2006.01) |
| *B22D 41/02* | (2006.01) |
| *B29C 70/50* | (2006.01) |
| B29K 33/00 | (2006.01) |
| B29K 101/12 | (2006.01) |
| B29K 105/16 | (2006.01) |

(52) U.S. Cl.
CPC ............ *B29C 70/025* (2013.01); *B22D 41/02* (2013.01); *B29C 70/50* (2013.01); *B29K 2033/12* (2013.01); *B29K 2101/12* (2013.01); *B29K 2105/16* (2013.01)

(58) Field of Classification Search
CPC .............................. B29C 70/025; B29C 70/50
See application file for complete search history.

(56) References Cited

U.S. PATENT DOCUMENTS

| | | | |
|---|---|---|---|
| 2,785,442 A | * | 3/1957 | Boggs ............... B29C 53/56 43/18.5 |
| 3,086,962 A | | 4/1963 | Mottus et al. |

(Continued)

FOREIGN PATENT DOCUMENTS

| | | |
|---|---|---|
| CA | 1 221 216 A1 | 5/1987 |
| CN | 103570961 A | 2/2014 |

(Continued)

OTHER PUBLICATIONS

Van Rijswijk, K., et al., Reactive processing of anionic polyamide-6 for application in fiber composites: A Comparitive study with melt processed polyamide and nanocomposites, Polymer Testing, vol. 25 (2006), pp. 873-887.

(Continued)

*Primary Examiner* — Andrew D Graham
(74) *Attorney, Agent, or Firm* — Robert D. Touslee

(57) ABSTRACT

A lightweight polymer-based composite product may include a polymer material body and a lightweight filler material that is embedded in the polymer. The polymer material body may be an in-situ polymerized polymer formed via casting of a reactive resin in a mold. The polymer may have a density of at least 1.0 g/cm³. The lightweight filler material may be concentrated on at least a portion of a first surface of the polymer material body. The lightweight filler material may have a density of between 0.1 and 1.0 g/cm³. The lightweight polymer-based composite product may have a density that is less than a comparable product that consists mainly of the polymer.

24 Claims, 10 Drawing Sheets

(56) References Cited

U.S. PATENT DOCUMENTS

| | | |
|---|---|---|
| 3,323,945 A | 6/1967 | Hechelhammer et al. |
| 3,347,818 A | 10/1967 | Lau et al. |
| 3,386,943 A | 6/1968 | Hedrick et al. |
| 3,417,097 A | 12/1968 | Downing et al. |
| 3,451,963 A | 6/1969 | Tierney et al. |
| 3,780,157 A | 12/1973 | Hechlhammer et al. |
| 3,833,534 A | 9/1974 | Tierney et al. |
| 3,849,154 A | 11/1974 | Michael et al. |
| 3,888,832 A | 6/1975 | Biensan et al. |
| 4,157,325 A * | 6/1979 | Charles .................. C08L 33/12 523/219 |
| 4,223,101 A | 9/1980 | Fine et al. |
| 4,271,229 A | 6/1981 | Temple |
| 4,339,490 A | 7/1982 | Yoshioka et al. |
| 4,495,017 A | 1/1985 | Abe et al. |
| 4,496,415 A | 1/1985 | Sprengling |
| 4,528,223 A | 7/1985 | Kumazawa et al. |
| 4,804,427 A | 2/1989 | Paul et al. |
| 5,017,629 A * | 5/1991 | Wilson .................. C08J 3/226 524/789 |
| 5,080,547 A * | 1/1992 | Moghe .................. B29C 70/085 411/908 |
| 5,116,216 A | 5/1992 | Cochran et al. |
| 5,127,783 A * | 7/1992 | Moghe .................. D04B 9/44 411/908 |
| 5,205,898 A | 4/1993 | Wilson et al. |
| 5,269,863 A | 12/1993 | Middelman |
| 5,294,461 A | 3/1994 | Ishida |
| 5,374,385 A | 12/1994 | Binse et al. |
| 5,407,616 A | 4/1995 | Dube |
| 5,424,388 A | 6/1995 | Chen et al. |
| 5,492,755 A | 2/1996 | Binse et al. |
| 5,505,492 A * | 4/1996 | Nelson .................. A63C 11/22 428/36.1 |
| 5,534,203 A * | 7/1996 | Nelson .................. A63B 53/12 264/257 |
| 5,536,352 A | 7/1996 | Zeman et al. |
| 5,679,719 A | 10/1997 | Klemarczyk et al. |
| 5,780,099 A | 7/1998 | Gilligan |
| 5,837,181 A | 11/1998 | Leimbacher et al. |
| 5,895,808 A | 4/1999 | Schmid et al. |
| 5,980,796 A | 11/1999 | Nussdorfer et al. |
| 6,171,688 B1 * | 1/2001 | Zheng .................. C08J 9/32 428/313.5 |
| 6,283,166 B1 | 9/2001 | Miyasato et al. |
| 6,369,157 B1 | 4/2002 | Winckler et al. |
| 6,436,548 B1 | 8/2002 | Phelps |
| 6,713,601 B2 | 3/2004 | Phelps |
| 7,037,865 B1 * | 5/2006 | Kimberly .................. B29C 70/66 428/407 |
| 7,151,143 B2 | 12/2006 | Wang et al. |
| 7,790,284 B2 | 9/2010 | Davies |
| 7,824,770 B2 | 11/2010 | Honma et al. |
| 8,007,907 B2 * | 8/2011 | Nakamura .................. B29B 7/728 427/195 |
| 8,123,887 B2 | 2/2012 | Green |
| 8,293,322 B2 | 10/2012 | Burghardt et al. |
| 8,394,731 B2 | 3/2013 | Sato et al. |
| 8,602,926 B2 * | 12/2013 | Griffith .................. F42B 6/06 473/585 |
| 9,186,852 B2 | 11/2015 | Zhang et al. |
| 9,815,954 B2 | 11/2017 | Zhang et al. |
| 9,962,888 B2 | 5/2018 | Zhang et al. |
| 9,993,945 B2 | 6/2018 | Zhang et al. |
| 10,105,871 B2 | 10/2018 | Zhang et al. |
| 11,527,835 B2 * | 12/2022 | Radelet .................. H01Q 15/08 |
| 2002/0038923 A1 * | 4/2002 | Lenherr .................. B29C 33/52 425/86 |
| 2004/0188883 A1 | 9/2004 | Barron et al. |
| 2005/0069712 A1 * | 3/2005 | Strait .................. C08J 5/244 427/407.1 |
| 2005/0214465 A1 | 9/2005 | Maskus et al. |
| 2005/0266757 A1 * | 12/2005 | Roekens .................. D04H 1/43828 442/108 |
| 2006/0194034 A1 * | 8/2006 | Kolzer .................. B29C 70/30 428/317.1 |
| 2008/0078150 A1 | 4/2008 | Kariya |
| 2008/0191378 A1 * | 8/2008 | Paul .................. B29C 70/025 264/122 |
| 2009/0233508 A1 | 9/2009 | Kubota et al. |
| 2009/0246468 A1 | 10/2009 | Schubiger |
| 2010/0040857 A1 | 2/2010 | Schubiger |
| 2010/0215920 A1 | 8/2010 | Orange et al. |
| 2010/0280239 A1 | 11/2010 | Shooshtari et al. |
| 2010/0305269 A1 | 12/2010 | Gleich et al. |
| 2011/0045275 A1 | 2/2011 | Tadepalli et al. |
| 2012/0107509 A1 | 5/2012 | Scherzer et al. |
| 2013/0196138 A1 * | 8/2013 | Fusco .................. B32B 27/26 422/135 |
| 2013/0221555 A1 | 8/2013 | Radtke et al. |
| 2013/0295806 A1 | 11/2013 | Imai et al. |
| 2014/0093736 A1 | 4/2014 | Takada et al. |
| 2014/0165585 A1 | 6/2014 | Burd |
| 2014/0203468 A1 * | 7/2014 | Humphries .................. B29C 70/025 264/71 |
| 2014/0217332 A1 * | 8/2014 | Simmons .................. B32B 17/04 264/105 |
| 2014/0256850 A1 * | 9/2014 | Gerard .................. C08J 5/247 523/222 |
| 2015/0145165 A1 | 5/2015 | Zhang et al. |
| 2015/0239209 A1 * | 8/2015 | Newton .................. B32B 5/12 428/113 |
| 2016/0046107 A1 | 2/2016 | Zhang et al. |
| 2016/0168350 A1 * | 6/2016 | Tseng .................. B32B 27/281 521/60 |
| 2017/0066158 A1 | 3/2017 | Zhang et al. |
| 2019/0048958 A1 * | 2/2019 | Karpenko .................. B29C 45/14549 |

FOREIGN PATENT DOCUMENTS

| | | |
|---|---|---|
| DE | 2 249 189 A1 | 4/1974 |
| DE | 43 37 970 C2 | 10/1996 |
| DE | 10 2007 031 467 A1 | 1/2009 |
| DE | 10 2011 055 263 A1 | 5/2013 |
| DE | 10 2010 040 027 B4 | 7/2013 |
| EP | 0 114 971 B1 | 3/1988 |
| EP | 0 134 992 B1 | 9/1988 |
| EP | 0 393 553 A2 | 4/1990 |
| EP | 0 589 640 A1 | 3/1994 |
| EP | 0 655 476 A1 | 5/1995 |
| EP | 0 752 306 A1 | 1/1997 |
| EP | 2 030 769 A1 | 3/2009 |
| EP | 2 774 944 A1 | 9/2014 |
| EP | 3 115 399 A1 | 1/2017 |
| EP | 3 141 576 A2 | 3/2017 |
| EP | 3 392 290 A1 | 10/2018 |
| FR | 2 645 070 A3 | 4/1989 |
| JP | 59-199863 A | 11/1984 |
| JP | S60226510 A | 11/1985 |
| WO | 95/00310 A1 | 1/1995 |
| WO | 2001053379 A1 | 7/2001 |
| WO | 2011/073200 A1 | 6/2011 |
| WO | 2011/006947 A1 | 9/2012 |
| WO | 2012/116947 A1 | 9/2012 |
| WO | 2013/050074 A1 | 4/2013 |
| WO | 2013/056845 A2 | 4/2013 |

OTHER PUBLICATIONS

Tripathy, A.R., et al., Effects of Catalyst and Polymerization Temperature on the In-Situ Polymerization of Cyclic Poly (Butylene Terephthalate) Oligomers for Composite Applications, Macromolecules, vol. 38 (2005), pp. 709-715.

* cited by examiner

LIGHTWEIGHT THERMOPLASTIC COMPOSITE PRODUCTS AND METHODS OF MAKING SAME

BACKGROUND

The use of reinforced composites is growing in popularity with applications in transportation, consumer goods, wind energy, and infrastructure. Some of the many reasons for choosing composites over traditional materials such as metals, wood, or non-reinforced plastics include reduced weight, corrosion resistance, and improved mechanical strength. Within the field of reinforced polymeric composites, thermoplastics are increasingly being used in place of thermosets as the matrix resin due to better durability, recyclability, thermoformability, improved throughput, lower material cost, and lower manufacturing cost.

Thermoplastic liquid molding with low viscosity monomers or oligomers has shown great potential as the technology for the mass production of thermoplastic composites. Compared to traditional thermoset molding of epoxy and polyurethane, thermoplastic liquid molding with monomers or oligomers provides various advantages such as short cycle times and superior properties of the resulting thermoplastic composites, including greater toughness and impact strength, weldability, and recyclability. One example of thermoplastic liquid molding is rotational molding, which is also known as rotomolding or rotational casting. Thermoplastic liquid molding may include a reinforcement.

BRIEF SUMMARY

The embodiments described herein provide lightweight polymer-based composite products including a lightweight filler and methods of forming the same. According to one embodiment, a lightweight polymer-based composite product includes a polymer material body and a lightweight filler material. The polymer material body includes an in-situ polymerized polymer formed via casting of a reactive resin in a mold. The polymer material body has a first surface and a second surface that is positioned opposite the first surface. The polymer has a density of at least 1.0 g/cm$^3$. The lightweight filler material is embedded in the polymer. The lightweight filler material may be concentrated on at least a portion of the first surface of the polymer material body so that the lightweight filler material forms a layer on the at least a portion of the first surface of the polymer material body. The lightweight filler material has a density of between 0.1 and 1.0 g/cm$^3$. The polymer-based composite product has a density that is less than a comparable product that consists mainly of the polymer. In some embodiments, the layer of the lightweight filler material may occupy between 3 and 50 percent by volume of the polymer-based composite product.

According to another embodiment, a method of forming a lightweight polymer-based composite product via casting includes applying a lightweight filler material to a mold cavity, applying a reactive resin to the mold cavity, and heating the reactive resin and lightweight filler material to polymerize the reactive resin and thereby form a body of polymer material having a shape corresponding to the mold cavity. The lightweight filler material has a density of between 0.1 and 1.0 g/cm$^3$. The lightweight filler material forms a layer atop the reactive resin within the mold cavity. The lightweight filler material is concentrated on at least a portion of a surface of the body so that the lightweight filler material forms a layer on the at least a portion of the surface of the body. The body of the composite product has a density that is less than a comparable product that consists mainly or essentially of the polymer.

According to another embodiment, a method of forming a lightweight polymer-based composite product via casting includes applying a pre-mixed mixture of a reactive resin and a lightweight filler material to a mold cavity, and heating the reactive resin and lightweight filler material to polymerize the reactive resin and thereby form a body of polymer material having a shape corresponding to the mold cavity. The lightweight filler material may form a layer atop the reactive resin within the mold cavity. The lightweight filler material may be concentrated on at least a portion of a surface of the body so that the lightweight filler material forms a layer on the at least a portion of the surface of the body.

According to yet another embodiment, a method of forming a lightweight polymer-based composite product via casting includes applying a homogeneous mixture of a reactive resin and a lightweight filler material to a mold cavity, and heating the reactive resin and lightweight filler material to polymerize the reactive resin and thereby form a body of polymer material having a shape corresponding to the mold cavity. When the viscosity of the reactive resin is high, for example 500 centipoise or higher, the lightweight fillers may remain homogeneously mixed with the resin during liquid molding and resin curing. The lightweight filler material may be distributed homogeneously throughout the polymer material body.

According to yet another embodiment, a lightweight polymer-based composite product includes a polymer material body formed of an in-situ polymerized polymer and a lightweight filler material that is embedded in the polymer. The polymer material body has a first surface and a second surface that is positioned opposite the first surface. The polymer has a density of at least 1.0 g/cm$^3$. The lightweight filler material that is embedded in the polymer is concentrated on at least a portion of the first surface of the polymer material body so that the lightweight filler material forms a layer on the at least a portion of the first surface of the polymer material body. The lightweight filler material has a density of between 0.1 and 1.0 g/cm$^3$. In some embodiments, the lightweight polymer-based composite also includes a fabric reinforcing sheet that is disposed within the polymer material body. The fabric reinforcing sheet may include a plurality of fibers that are saturated or impregnated with the polymer.

According to yet another embodiment, a method of forming a lightweight polymer-based composite product includes positioning a fabric reinforcing sheet within a mold cavity, applying a lightweight filler material to the mold cavity, applying a reactive resin to the mold cavity, and heating the reactive resin to polymerize the reactive resin. The fabric reinforcing sheet extends longitudinally along at least a portion of the mold cavity. The fabric reinforcing sheet includes a plurality of fibers. The lightweight filler material has a density of between 0.1 and 1.0 g/cm$^3$. The reactive resin fully saturates or impregnates the lightweight filler material. The lightweight filler material forms a layer atop the reactive resin within the mold cavity. Heating the reactive resin to polymerize the reactive resin forms the lightweight polymer-based composite product having a shape corresponding to the mold cavity. The lightweight filler material is concentrated on at least a portion of a surface of the polymer material body. The lightweight filler material forms a layer on the surface of the polymer material body.

BRIEF DESCRIPTION OF THE DRAWINGS

The present technology is described in conjunction with the appended figures.

Figure 1A:
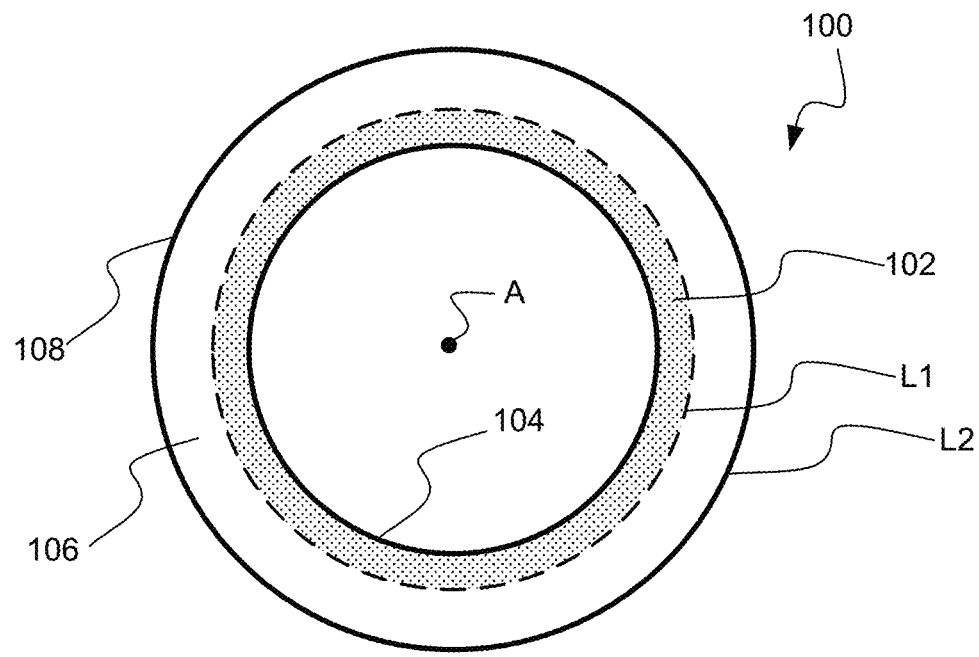
FIG. 1A illustrates a top view of a lightweight polymer-based composite product that may be used in the processes and products described herein.

In the appended figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION

The embodiments described herein relate to lightweight polymer-based composite products, and specifically use of lightweight filler material or products that employ such lightweight filler material. In some embodiments, the lightweight filler material may be fully impregnated with polymeric materials. The lightweight filler material may be hollow glass microspheres. The lightweight polymer-based composite products are made using reactive resin materials, specifically monomers or oligomers. In an exemplary embodiment, the reactive resin material may be a reactive thermoplastic resin material such as caprolactam, or reactive components of thermoplastic polyurethane (TPU). In some embodiments, the reactive resin material may be a reactive thermoset resin such as polyurethane, epoxy, or polyester. In other embodiments, the lightweight polymer-based composite products including a lightweight filler material may further include a fabric reinforcing sheet partially or fully impregnated with the polymer material.

Liquid monomer or oligomer casting produces polymer products having a high molecular weight. Caprolactam may be cast to produce Nylon-6 polymer products that have a high molecular weight and a high degree of crystallization and exhibit advantageous properties including high strength, low friction, and increased wear resistance. Additives such as lubricants or thermal stabilizers may further be included to tailor the characteristics of cast polymers, such as Nylon.

Casting processes may include gravity casting and centrifugal casting to produce polymer products for various applications. Gravity casting involves dispensing mixed reactive resin (e.g., caprolactam) into a stationary mold, followed by in-situ polymerization of resin to form a thermoplastic or thermoset part (e.g., a Nylon 6 part). Gravity casting is discussed with reference to FIGS. 5-7B.

Another casting process is rotational or centrifugal casting or molding, as will be discussed with reference to FIGS. 1A-2 and 4. In a centrifugal casting process, the reactive resin is applied into a mold, which is rotating about an axis. In-situ polymerization of the reactive resin occurs within the rotating mold. Rotational molding is a casting technique that is typically used to form tubular products. Among other parts, tubes, or other cylindrical shapes can be easily produced via a centrifugal casting process. The process may employ various materials such as metal, glass, concrete, and polymer materials. Various thermoplastic and thermoset materials are often used in rotational molding to form various products, including storage tanks, containers, crates, pallets, litter bins, road cones, bollards, floats, buoys, kayaks, canoes, boats, planters, and toys.

Conventional rotationally molded thermoplastic and thermoset materials typically do not include a reinforcement material, due to the nature of rotational molding process where the liquid resin material is in rotational motion during the molding process. The rotational motion of the resin material renders the fixation of a reinforcement material within a mold extremely difficult, if not impossible. Rather, the cast part is composed mainly of the polymer material. Because the parts are not reinforced, thick parts are often needed for demanding applications in which relatively high strength is required. The increased thickness of the part leads to a significant increase in the weight of the part.

In other applications where cast parts are an integral part of an insulation system, higher insulation value materials may be desired. The use of the lightweight filler material herein increases heat insulation of molded parts. For example, cast Nylon centralizers have been used in pipe-in-pipe system for deep sea drilling, in which higher insulation value is highly preferred. In these applications, an increase in the insulation value of the cast thermoplastic parts greatly enhances the heat insulation of the overall pipe system. Exemplary lightweight filler material that improves insulation include, but not limited to, hollow glass microsphere and expanded perlite.

The lightweight filler material, having a density less than the resin, typically rises within the mold to form a layer of low density material at or near the surface. As such, in contrast to conventional products, the rotationally molded products that are formed by employing the lightweight filler material, and optionally additional fabric reinforcing sheet(s), are reinforced with a material of high crush strength and high insulation value.

In other embodiments, the lightweight filler material may be homogeneously mixed with the reactive resin or a component of the reactive resin, especially when the reactive resin or its component has sufficiently high viscosity. In such embodiment, the lightweight filler material may remain homogeneously mixed with the resin during molding and resin curing. In such embodiments, a layer of low density material, or a layered molded structure, is not formed in the composite product.

In other embodiments, the lightweight filler material may be used in other liquid molding processes that employ thermoplastic materials. For example, resin transfer molding (RTM) processes commonly use caprolactam to produce fiber reinforced Nylon-6 composites for lightweight automotive structures. Caprolactam is often used due to its low viscosity, which enables the liquid resin to thoroughly impregnate lightweight fillers such as hollow glass microspheres. This type of thermoplastic liquid molding may be used to produce glass microsphere reinforced thermoplastic composites with high insulation value and relatively complex shapes, which are not attainable with viscous thermoplastic polymer melts. Additionally, the liquid resin may be used to thoroughly impregnate fiber reinforcements such as woven or non-woven fabrics for further reinforcement. The lightweight composite products and methods described herein advantageously provide materials characterized by lower density, higher composite strength, and higher insulation value.

Lightweight Polymer-Based Composite Products

Referring now to FIG. 1A, illustrated is an example of a lightweight polymer-based composite product 100 that may be used in the various processes described herein. In an exemplary embodiment, the lightweight fillers in the composite product 100 may be fully impregnated with the polymer. For example, a lightweight filler material may be embedded into the polymer, such as Nylon 6.

The lightweight polymer-based composite product 100 includes a lightweight filler material 102 and a polymer 106, which is formed of a polymerized reactive resin or resins. The lightweight polymer-based composite product 100 may include between 50 and 99 weight percent of the polymerized reactive resin, more preferably between 60 and 95 weight percent of the polymerized reactive resin, and more preferably between 70 and 90 weight percent of the polymerized reactive resin. The lightweight polymer-based composite product 100 may also include between 1 and 50 weight percent of the lightweight filler material 102, preferably between 5 and 40 weight percent of the lightweight filler material 102, and more preferably between 10 and 30 weight percent of the lightweight filler material 102. These ranges for the polymerized reactive resin and/or lightweight filler material 102 apply equally to the other polymer-based components products described herein.

Figure 2:
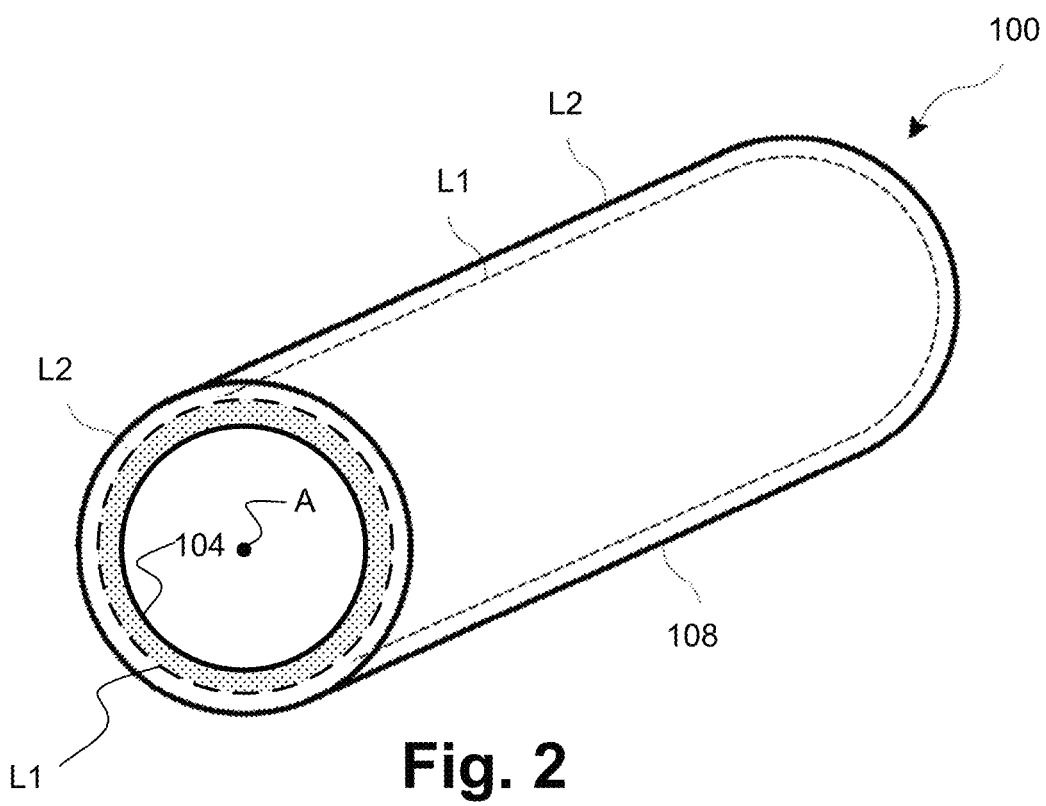
FIG. 2 illustrates a perspective view of the lightweight polymer-based composite product of FIG. 1A or FIG. 1B.

The lightweight polymer-based composite product 100 has an inner circumferential surface 104 and an outer circumferential surface 108 with polymer 106 there between. The inner and outer circumferential surfaces 104 and 108 are concentric about axis A. The lightweight polymer-based composite product 100 may include a first layer L1 and a second layer L2. The layers may extend longitudinally as illustrated in FIG. 2. The first layer L1 may include the lightweight filler material 102 embedded in the polymer 106, and the second layer L2 may include the polymer 106. The lightweight filler material 102 that is embedded in the polymer 106 may be concentrated on at least a portion of the inner circumferential surface 104 to form layer L1. A density of the first layer L1 is typically substantially less than a density of the second layer L2. In some embodiments, the first layer L1 may occupy between 3 and 50 percent by volume of the polymer-based composite product 100.

The polymer has a density of at least about 1.0 g/cm$^3$. The polymer may be formed via in-situ polymerization of a reactive thermoplastic resin. The reactive thermoplastic resin is typically a low viscosity pre-polymerized material suitable for the casting process. An exemplary type of reactive thermoplastic resin includes materials that are composed mainly of precursor monomers and/or oligomers, such as caprolactam, laurolactam, methyl methacrylate (MMA), cyclic butylene terephthalate (CBT), isocyanate end capped prepolymers and polyols of thermoplastic polyurethane (TPU), cyclic alkenes, and the like. In some embodiments, the reactive thermoplastic resin is caprolactam for forming a Nylon 6-based lightweight composite product. The density of Nylon-6 is about 1.1 g/cm$^3$. In other embodiments, the reactive thermoplastic resin is isocyanate end capped prepolymers and polyols for forming a thermoplastic polyurethane (TPU) based lightweight composite product. The density of TPU is typically higher than 1.1 g/cm$^3$.

In other embodiments, the polymer may be formed via polymerization of a reactive thermoset resin. The reactive thermoset resin is also typically a low viscosity pre-polymerized material suitable for the casting process. An exemplary type of reactive thermoset resin includes materials that are composed mainly of precursor monomers and/or oligomers, such as uncured polyurethane, epoxy, or polyester. In some embodiments, the reactive thermoset resin is a mixture of isocyanate and polyol for forming a thermoset polyurethane-based lightweight composite product. For ease in describing the embodiments, the reactive resin will be referred to mainly as a thermoplastic material. It should be realized, however, that a thermoset material may be used in addition to, or in place of, the thermoplastic material described herein and/or in the claims. Thus, the embodiments and disclosure are not intended to be limited to thermoplastic materials unless specifically claimed.

Figure 3:
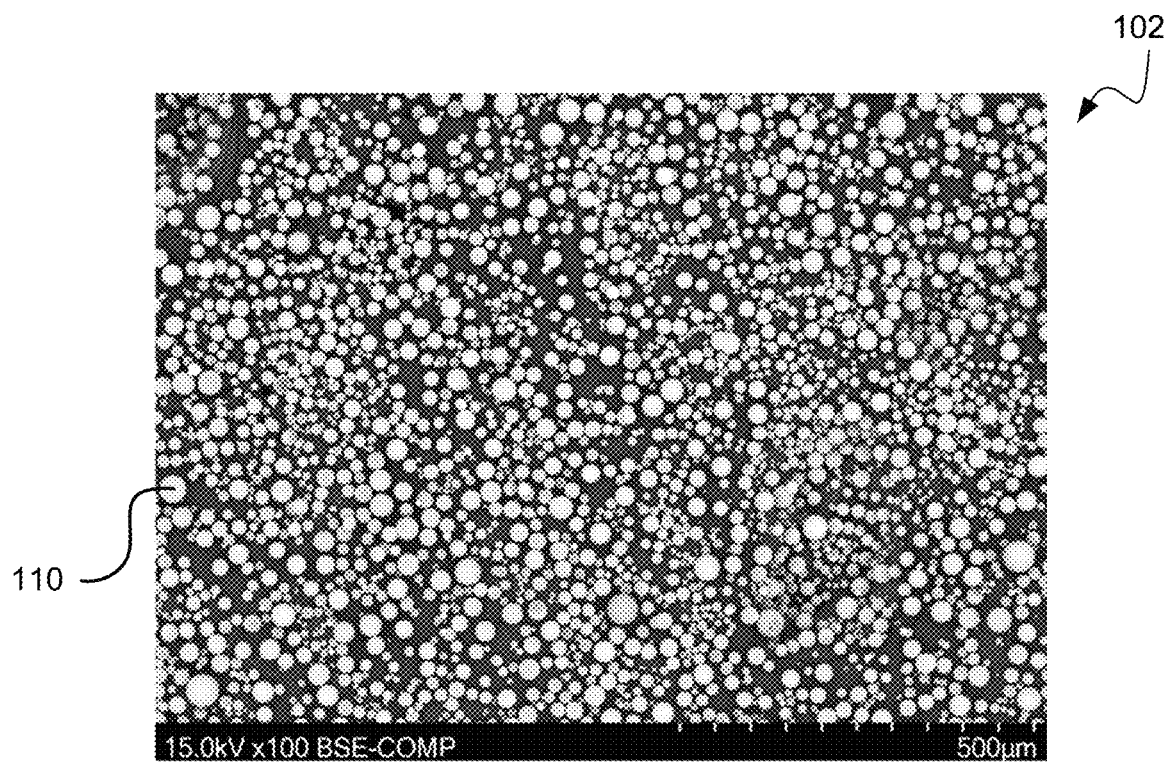
FIG. 3 illustrates a lightweight filler that may be used in the processes and products described herein.

The density of the lightweight filler material may range from between about 0.1 and 1.0 g/cm$^3$. In a more specific embodiment, the density of the lightweight filler material may range from between about 0.2 and 0.6 g/cm$^3$, and more commonly between about 0.3 and 0.5 g/cm$^3$. In some embodiments, the density of the lightweight filler material is about 0.4 g/cm$^3$. In some embodiments, the density of the lightweight filler material is at most one-half of the density of the polymer, or the density of the lightweight filler is at most one-third of the density of the polymer. The lightweight filler material 102 may include hollow glass microspheres, an example of which is illustrated in the scanning electron micrograph of FIG. 3. The hollow glass microspheres 110 may be referred to as glass bubbles. The hollow glass microspheres may have a median particle size of 10-100 microns. The hollow glass microspheres may be made of soda-lime borosilicate glass. The hollow glass microspheres may be characterized by a crush strength of 250 psi or higher. Additional functionalities, such as silane coatings, may be added to the surface of the hollow glass microspheres to increase the interfacial strength between the hollow glass microspheres and the polymer resin matrix.

Figure 1B:
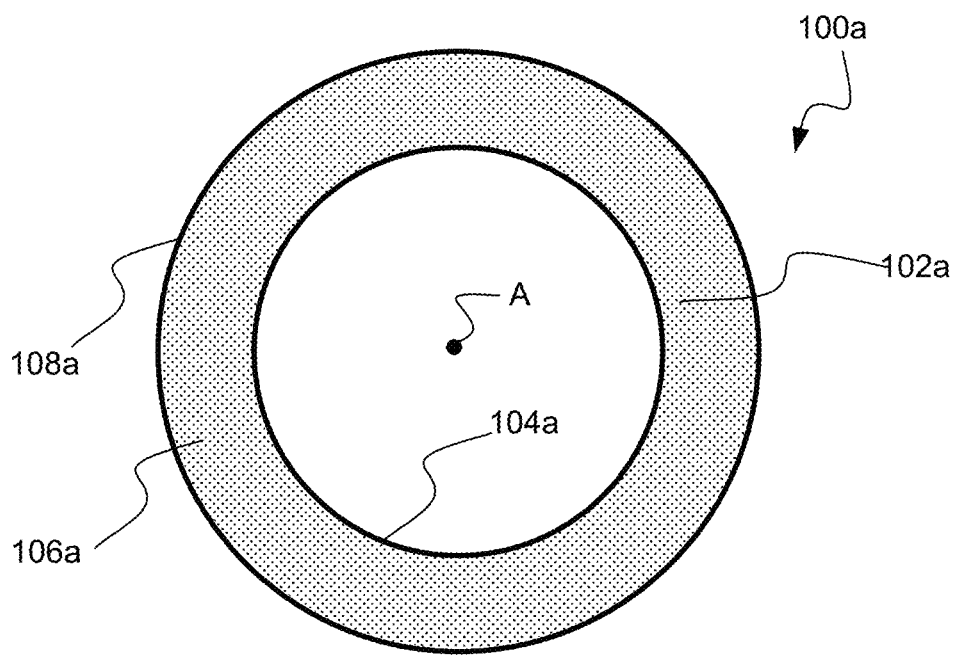
FIG. 1B illustrates a top view of another lightweight polymer-based composite product that may be used in the processes and products described herein.

Referring now to FIG. 1B, illustrated is an example of another lightweight polymer-based composite product 100a that may be used in the various processes described herein. As previously described, the lightweight fillers in the composite product 100a may be fully impregnated with the polymer. The lightweight polymer-based composite product 100a includes a lightweight filler material 102a and a polymer 106a, which is formed of a polymerized reactive resin or resins. The lightweight polymer-based composite product 100a may include between 50 and 99 weight percent of the polymerized reactive resin, more preferably between 60 and 95 weight percent of the polymerized reactive resin, and more preferably between 70 and 90 weight percent of the polymerized reactive resin. The lightweight polymer-based composite product 100a may also include between 1 and 50 weight percent of the lightweight filler material 102a, preferably between 5 and 40 weight percent of the lightweight filler material 102a, and more preferably between 10 and 30 weight percent of the lightweight filler material 102a.

The lightweight polymer-based composite product 100a has an inner circumferential surface 104a and an outer circumferential surface 108a that are concentric about axis A. The lightweight filler material 102a is embedded in the polymer 106a. The lightweight filler material 102a and polymer 106a are distributed homogeneously throughout the polymer material body between the inner circumferential surface 104a and an outer circumferential surface 108a. The viscosity of the reactive resin is sufficiently high such that the lightweight filler material 102a remains homogeneously mixed with the resin during liquid molding and resin curing. In some embodiments, the viscosity of the reactive resin may be at least 500 centipoises. The polymer 106a is formed via in-situ polymerization of a reactive thermoplastic or thermoset resin as described herein.

Centrifugal Casting/Rotational Molding

Figure 4:
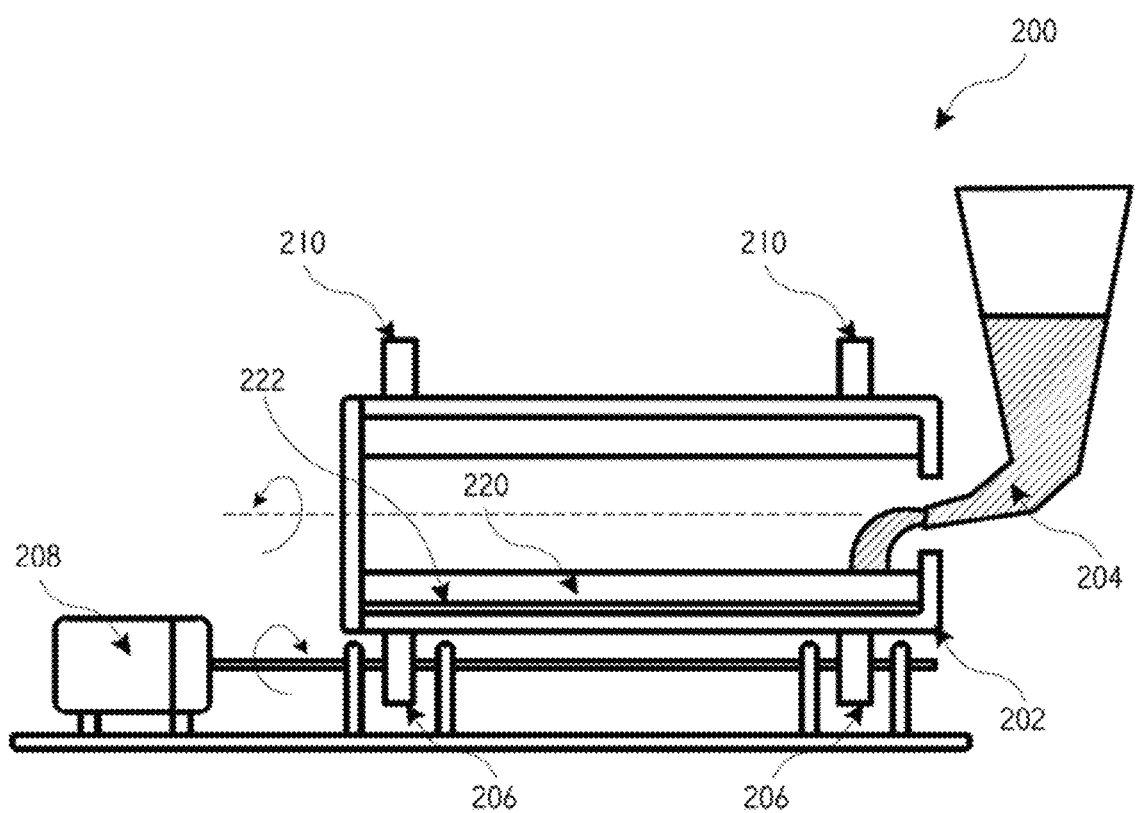
FIG. 4 illustrates an embodiment of a centrifugal casting system.

Referring to FIG. 4, illustrated is an embodiment of a centrifugal casting system 200 where a material, such as a reactive thermoplastic resin material, is spun within a mold 202 and cast radially outward and cured into a shape, such as a pipe or other generally cylindrical object. In addition to the mold 202, the system 200 includes a container 204 or tank within which the resin material is contained. In the instant system, the container may be filled with a reactive thermoplastic resin (e.g., caprolactam). The container 204 is fluidly connected to the mold 202 in order to allow the material to be delivered to an interior of the mold 202. The mold is rotationally mounted within the system 200 and is configured to be rotationally driven via one or more drive mechanism 206, which may include rollers, bearings, gears, and the like. A motor device 208 is used to supply the rotational input to the drive mechanism 206. The system 200 may include one or more additional stabilizer component 210, such as one or more rollers positioned opposite the drive mechanism 206.

The material that is injected into the mold 202 is cast radially outward and into contact with an inner surface of the mold 202 due to centrifugal forces. The material is cured or polymerized within the mold 202 to form the polymerized end product 220. The polymerized end product 220 has an exterior surface that matches or corresponds to the interior surface of the mold 202. Examples of products that are formed via rotational molding or centrifugal casting include: storage tanks, containers, litter bins, road cones, bollards, floats, buoys, kayaks, canoes, boats, planters, and toys.

Various methods may be employed to introduce the lightweight filler material, 102/102a, into cast parts. In some embodiments, a lightweight filler material (e.g., hollow glass microspheres 110) is mixed with a reactive thermoplastic resin (e.g., caprolactam), to form a reactive thermoplastic resin mixture in container 204 for dispensing or injecting into the mold 202. In other embodiments, a lightweight filler material is pre-mixed with a component of a reactive resin, before forming a reactive thermoplastic resin mixture in container 204 for dispensing or injecting into the mold 202. In another embodiment, a lightweight filler material, 102/102a, is introduced into the mold 202 prior to dispensing a reactive thermoplastic resin from container 204 or subsequent to dispensing the reactive thermoplastic resin from container 204. In yet another embodiment, at least a portion of the lightweight filler material, 102/102a, may be mixed with a reactive thermoplastic resin in container 204 to form a reactive thermoplastic resin mixture, while the remaining portion of lightweight filler material may be introduced into the mold 202 prior to resin dispensing. The resulting cast Nylon parts have not only lower density but also high strength, due to the presence of the lightweight filler material such as high strength hollow glass microspheres. Due to the low melt viscosity of caprolactam, impregnation of hollow glass microspheres with caprolactam resin may be readily achieved in a short time duration.

Additionally, hollow glass microspheres have lower thermal conductivity (i.e. about 0.05 to 0.20 w/mK @20° C.) than Nylon, therefore the cast Nylon parts containing hollow glass microspheres as lightweight filler material may have higher insulation value. In some embodiment, the lower density of the lightweight filler material may cause the hollow glass microspheres to float to the top surface of a liquid caprolactam mixture, resulting in a "layered" structure with hollow glass microspheres concentrated in the surface layer of cast Nylon parts, the layered structure as depicted in FIGS. 1A and 2. In such embodiments, the layer of lightweight filler material is typically on an inner surface of the product as illustrated in FIGS. 1A and 2. Thus, these products are excellent for thermal insulation applications since the more thermally insulative material (i.e., hollow glass microspheres) are on the inner surface, which is typically positioned directly adjacent, or in direct contact, with an object to be insulated, such as a pipe, tubing, or other object. In other embodiments, the viscosity of the reactive resin may be sufficiently high such that the hollow glass microspheres may remain homogenously mixed with the resin. In such embodiments, a homogenously mixed product is formed, such as the product illustrated in FIG. 1B. These products are significantly lighter than similar products that are formed from a polymer material only.

Gravity Casting

Figure 5:
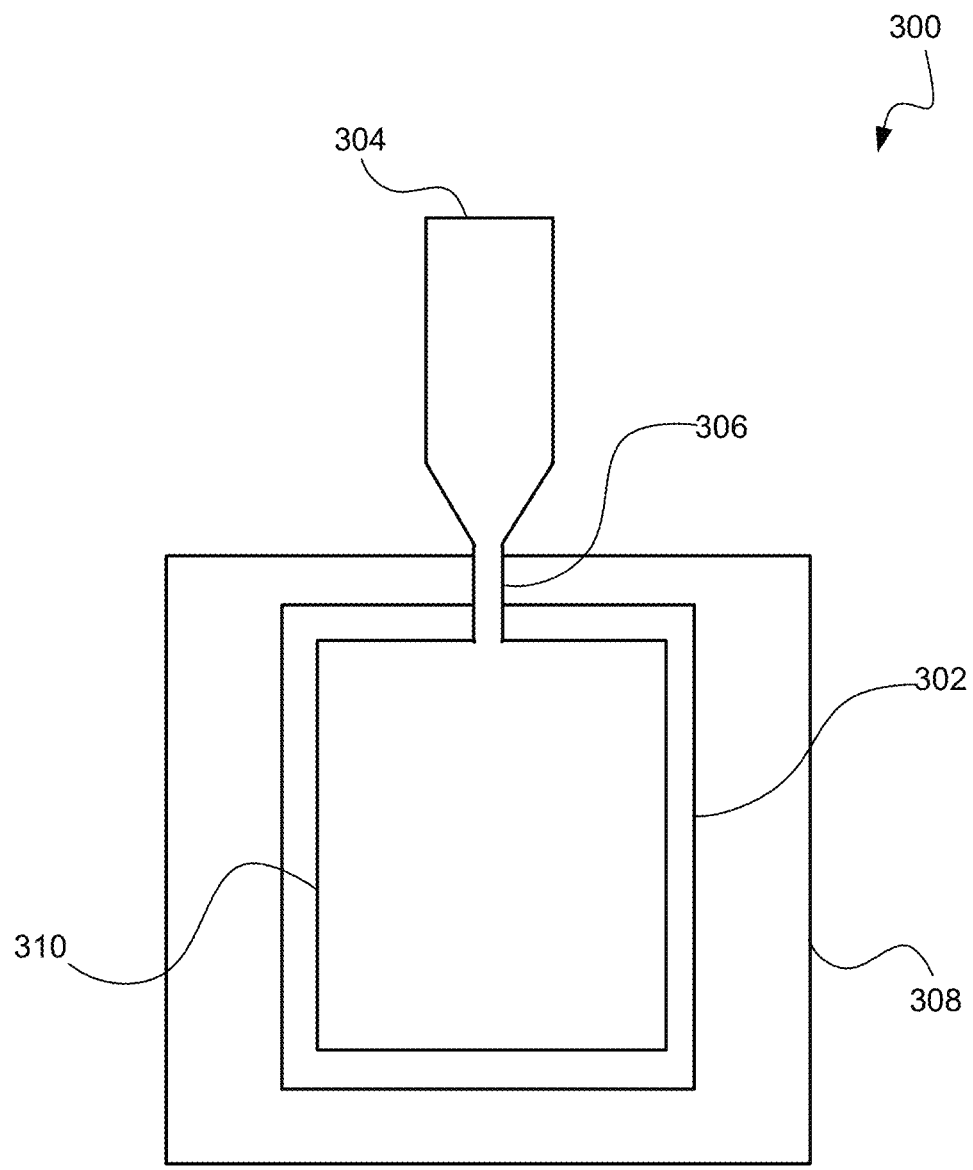
FIG. 5 illustrates an embodiment of a gravity casting system.

Referring to FIG. 5, illustrated schematically is an embodiment of a gravity casting system 300 that is configured to form lightweight polymer-based composite products including a lightweight filler. Tank or container 304 contains the reactive thermoplastic resin (e.g., caprolactam) and/or lightweight filler material. Tank 304 may be partitioned to keep the resin and lightweight filler material components, as well as other optional additives, separate prior to gravity casting. In other embodiments, the various materials, resin, lightweight filler material, and/or optional additives, may be homogenously mixed in tank 304. As shown in FIG. 5, tank 304 is at the topmost portion of the gravity casting system 300 configured so that the material contained within tank 304 is poured by gravity into the mold 302—i.e., gravity cast. Tank 304 may optionally be positioned on a side or elsewhere within system 300, provided the tank 304 is connected to mold 302 so that gravity draws or pulls the material into the mold 302. Tank 304 is connected to mold 302 by a nozzle or sprue 306. The system 300 further includes an oven 308 for heating mold 302 to form the gravity cast product 310, which is removed from the mold upon cooling. The oven 308 may be heated to a polymerization temperature of the reactive thermoplastic resin. The mold may be in two or more parts to accommodate ready removal of product 310.

Examples of products that are formed via gravity casting include: stock shapes, tools, consumer goods, gears, wheels, models and figures, and toys.

Figure 6:
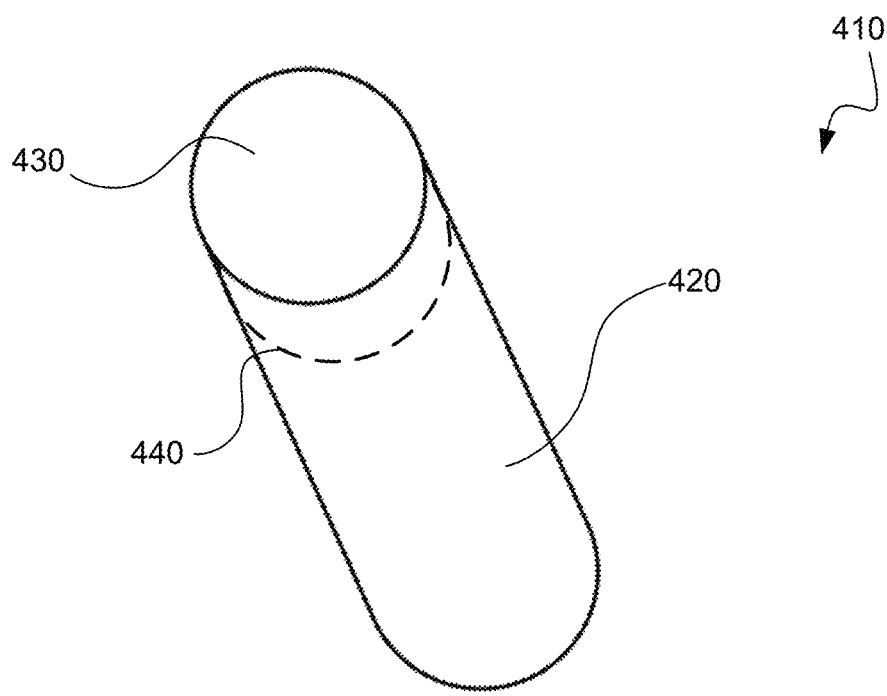
FIG. 6 illustrates a perspective view of a cylindrical lightweight polymer-based composite product made by the gravity casting system of FIG. 5.
Figure 7A:
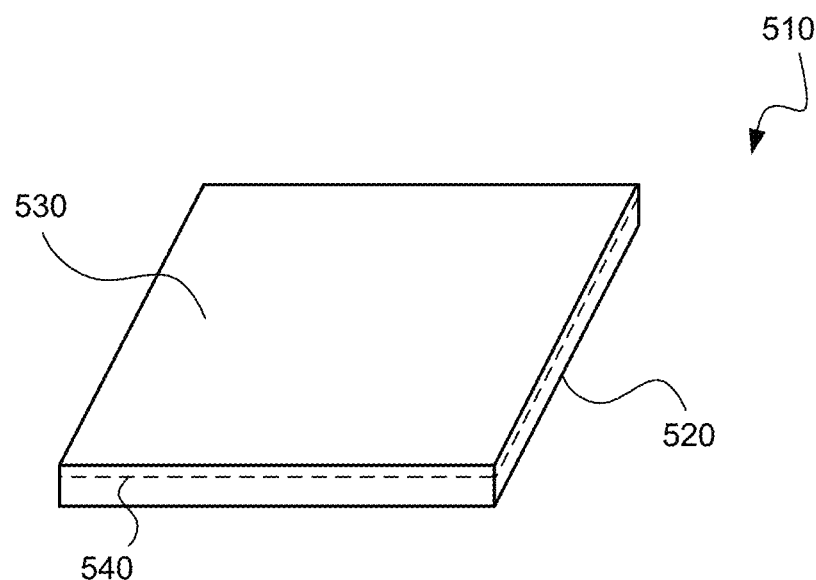
FIG. 7A illustrates a perspective view of a planar lightweight polymer-based composite product made by the gravity casting system of FIG. 5.
Figure 7B:
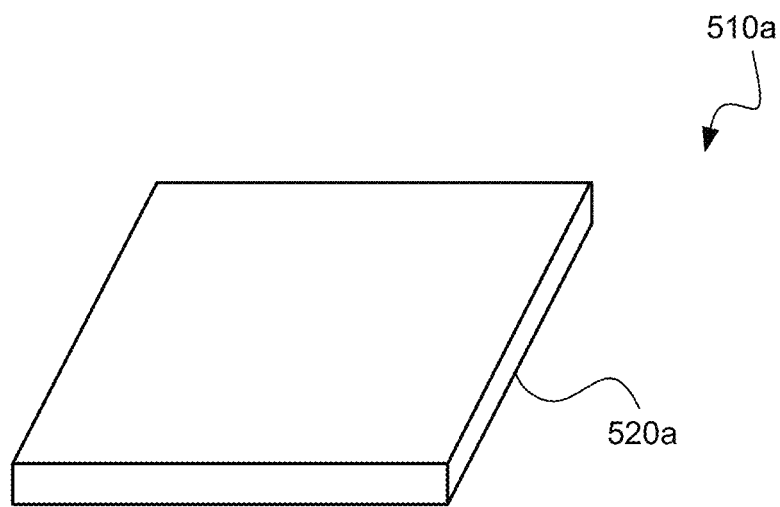
FIG. 7B illustrates a perspective view of another planar lightweight polymer-based composite product made by the gravity casting system of FIG. 5.

Referring to FIG. 6-7B, illustrated are examples of products formed by gravity casting. FIG. 6 illustrates a perspective view of a cylindrical lightweight polymer-based composite product 410, which may be made by a gravity casting system, such as the system of FIG. 5. The cylindrical rod product 410 includes a body portion 420 formed of thermoplastic material and a lightweight portion 430. Lightweight portion 430 includes substantially all of the lightweight material from the gravity casting in addition to some thermoplastic matrix resin that binds the lightweight filler material together. Line 440 represents an interface between the thermoplastic portion 420 and the lightweight portion 430. This separating of the lightweight filler material upon casting from the body portion 420 results from the lightweight filler material, having a lower density as previously discussed, floating or rising to the top of the mold (mold 302 of FIG. 5) to form lightweight portion 430. When the viscosity of the reactive resin is sufficiently high, the lightweight filler material may be homogenously mixed with the polymer. In such embodiments, the cylindrical lightweight polymer-based composite product 410 does not include a separate lightweight portion 430. Rather, the body portion 420 includes a homogenous dispersion or mixture of the lightweight filler material and polymer.

FIG. 7A illustrates a perspective view of a planar lightweight polymer-based composite product 510, which may be made by a gravity casting system, such as the system of FIG. 5. The rectangular board product 510 includes a body portion 520 formed of thermoplastic material and a lightweight portion 530. Lightweight portion 530 includes substantially all of the lightweight material from the gravity casting in addition to some thermoplastic matrix resin that binds the lightweight material together. Line 540 represents an interface between the thermoplastic portion 520 and the lightweight portion 530. Again, this separating of the lightweight material upon casting from the body portion 520 results from the lower density lightweight material floating or rising to the top of the mold (mold 302 of FIG. 5) to form lightweight portion 530. The lightweight portions 430 and 530 may advantageously increase the hardness of respective cast products 410 and 510, which may increase scratch resistance of the product. In some embodiments, the lightweight portion 530 may occupy between 3 and 50 percent by volume of the rectangular board product 510. FIG. 7B illustrates a perspective view of another planar lightweight polymer-based composite product 510a, which may be made by a gravity casting system, such as the system of FIG. 5. The lightweight filler material in FIG. 7B is homogenously mixed with the polymer. As such, the planar lightweight polymer-based composite product 510a does not include a separate lightweight portion (i.e., 530). Rather, the body portion 520a includes a homogenous dispersion or mixture of the lightweight filler material and polymer.

Methods of Forming a Lightweight Polymer-Based Composite Product

Figure 8:
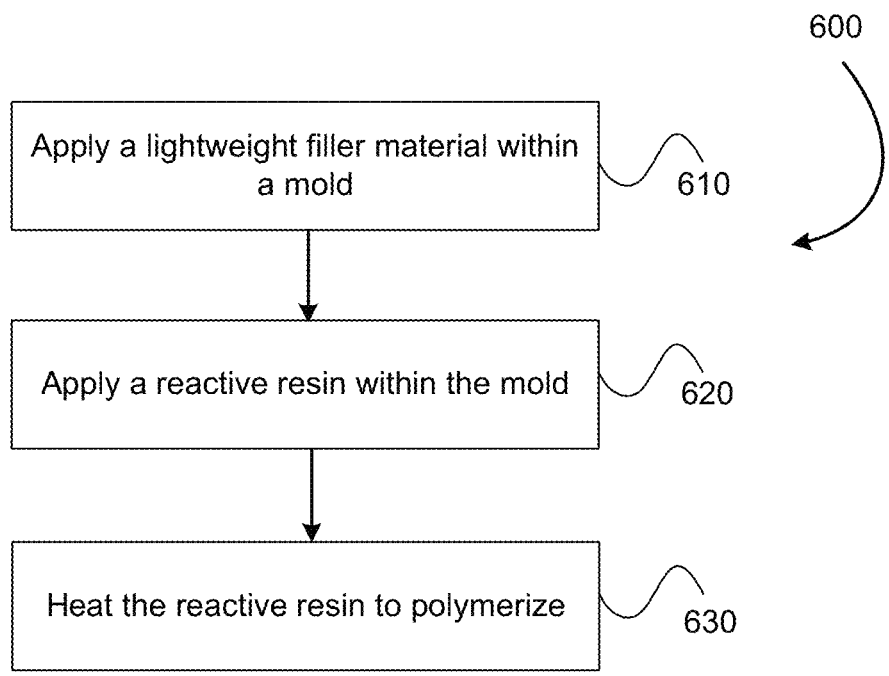
FIG. 8 illustrates a method of forming a lightweight polymer-based composite product.

Referring now to FIG. 8, illustrated is a method 600 of forming a lightweight polymer-based composite product. At block 610, the method includes applying a lightweight filler material to a mold cavity. In some instances, the mold may be a centrifugal casting mold (mold 202 of FIG. 4) and in other instances the mold may be a gravity casting mold (mold 302 of FIG. 5). The lightweight filler material may have a density of between 0.1 and 1.0 g/cm$^3$. In some instances, the lightweight filler material may be applied directly to the mold or fed through a container such as container 204 as shown in FIG. 4 or fed through tank 304 as shown in FIG. 5. In other instances, the lightweight filler material is, at least in part, mixed with and applied concurrently with the reactive resin as in block 620. In other instances, the lightweight filler material is pre-mixed with a component of the reactive resin, before being applied to the mold or fed through a container.

At block 620, a reactive thermoplastic resin is applied within the mold cavity. In the centrifugal casting embodiments, the reactive thermoplastic resin may be injected so that the reactive thermoplastic resin is centrifugally forced outward within the mold into contact with the lightweight filler material and an inside wall of the centrifugal casting mold. The reactive thermoplastic resin may include caprolactam, laurolactam, methyl methacrylate (MMA), cyclic butylene terephthalate (CBT), reactive components of thermoplastic polyurethane (TPU), cyclic alkenes, or some combination thereof. The lightweight filler material may form a layer atop the reactive resin within the mold cavity due to the lower density of the lightweight filler material relative to the reactive resin. In other embodiment, the lightweight filler material may remain homogenously mixed with the reactive resin within the mold cavity due to the viscosity of the reactive resin being sufficiently high. In the gravity casting embodiments, the reactive thermoplastic resin may be fed by gravity into the mold via tube 306 (as in FIG. 5). This is done without pressure using only the force of gravity.

At block 630, the reactive resin and lightweight filler material are heated to polymerize the reactive resin. The heating thereby may form a body of polymer material having a shape corresponding to the mold cavity. The lightweight filler material may be concentrated on at least a portion of a surface of the body so that the lightweight filler material forms a layer on the at least a portion of the surface of the body. In other embodiments, the lightweight filler material may remain homogenously dispersed within the polymer matrix upon polymerization of the reactive resin. The body may have a density that is less than a comparable product that consists mainly or essentially of the polymer. In the gravity casting embodiments, the heating of the mold 302 as shown in FIG. 5 by oven 308 is performed at a temperature of between about 50° C. and 150° C.

Lightweight Polymer-Based Composite Products Including Fabric Reinforcing Sheet

In some embodiments, the lightweight polymer-based composite products herein further include fabric reinforcing sheets or thermoplastic prepregs. The fabric reinforcing sheets employed herein are "fabric-based" meaning that the prepregs include a fabric reinforcement material, such as those described below. In an exemplary embodiment, the thermoplastic prepregs are fully impregnated with the thermoplastic resin, although partially impregnated prepregs may also be used. In some embodiments, fabric reinforcing sheets may be produced through impregnation of the fabric materials with low viscosity monomers or oligomers, followed by in-situ polymerization to form a thermoplastic matrix. Exemplary methods of producing fully impregnated thermoplastic prepregs are further described in U.S. patent application Ser. No. 14/088,034, filed Nov. 22, 2013, entitled "Fiber-Containing Prepregs and Methods and Systems of Making"; U.S. patent application Ser. No. 14/794,634, filed Jul. 8, 2015, entitled "System for Producing a Fully Impregnated Thermoplastic Prepreg"; U.S. patent application Ser. No. 14/845,007, filed Sep. 3, 2015, entitled "System for Producing a Fully Impregnated Thermoplastic Prepreg"; U.S. patent application Ser. No. 14/880,307, filed Oct. 12, 2015, entitled "System for Producing a Fully Impregnated Thermoplastic Prepreg"; and U.S. Pat. No. 9,186,852, entitled "Fiber-Containing Prepregs and Methods and Systems of Making". Each of the above U.S. patents and U.S. patent application are incorporated by reference herein.

In other embodiments, the fabric reinforcing sheets can be produced through the use of a thermoplastic polymer powder material that is positioned and impregnated within the fabric, or through the use of a thermoplastic polymer film that is positioned atop the fabric material and impregnated within the fabric under heat and pressure. Exemplary methods of producing such thermoplastic prepregs are further described in U.S. patent application Ser. No. 13/915,023, filed Jun. 11, 2013, entitled "Sized Glass Fibers for Fiber-Containing Composite Articles and Methods of Making Them", the entire disclosure of which is incorporated by reference herein.

Figure 9:
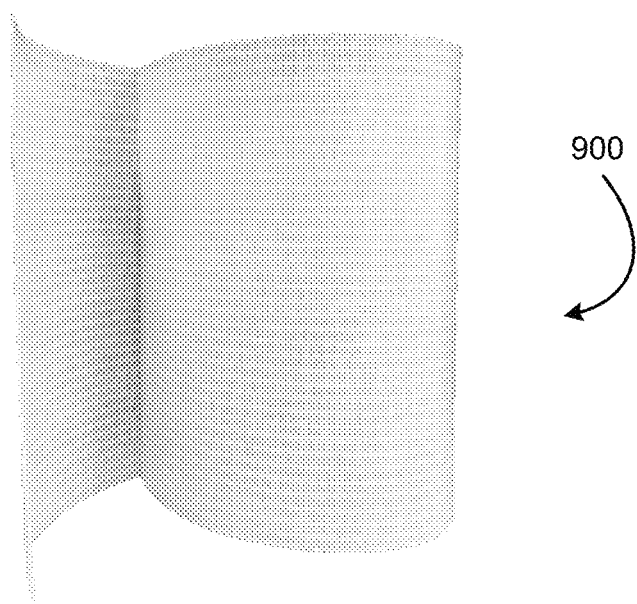
FIG. 9 illustrates a thermoplastic prepreg that may be used as a fabric reinforcing sheet in the processes and products described herein.

Referring now to FIG. 9, illustrated is an example of a fabric reinforcing sheet 900 that may be used in the various processes described herein. In an exemplary embodiment, the fabric reinforcing sheet or thermoplastic prepreg 900 may be fully impregnated with the thermoplastic resin. For example, a nylon-6 prepreg may be produced through the impregnation of a reinforcement fabric with molten caprolactam followed by in-situ polymerization of the caprolactam.

The fabric reinforcing sheet 900 may include a plurality of fibers, rovings, or fiber bundles (hereinafter fiber bundles or rovings). The rovings may contain continuous glass fibers or other fibers. In some embodiments, the rovings may be woven together. In other embodiments, the rovings may be held together via stitching, or the fibers may be entangled, intermeshed, or formed in a randomly oriented configuration. In embodiments that employ stitching, the stitching threads that are used may be polymeric fibers or other fibers. In yet other embodiments, the rovings may be oriented in a roughly parallel direction. In such embodiments, the fabric reinforcing sheet 900 may have a unidirectional fiber orientation.

The term roving or fiber bundle as used herein refers to a bundle of fibers that are positioned adjacent one another to form a rope, thread, or cord like component. A common type of fiber that is used in the rovings is glass fibers, although various other fibers could be used, includes carbon fibers, basalt fibers, metal fibers, ceramic fiber, natural fibers, synthetic organic fibers such as aramid fibers, and other inorganic fibers.

In some embodiments, the rovings may be oriented along a first direction and along a second direction, with the second direction angled relative to the first direction. For example, the second direction may be angled relative to the first direction by 45 degrees, 90 degrees, and the like. The woven materials are materials that are produced by weaving multiple roving strands together. The roving strands are commonly woven so that a first plurality of strands extend in a first direction (e.g., weft direction) and a second plurality of strands extend in a second direction that is typically orthogonal to the first direction (e.g., warp direction). The first plurality of strands are roughly parallel with one another as are the second plurality of strands. Various weaves may be used to form the fabric reinforcing sheets 900 described herein, including: plain weaves, twill weaves, satin weaves, multi-axial weaves, or stitching. The fabric reinforcing sheets 900 may contain any kind of woven fabric or multi-axial fabric material. In some instances, the fabric reinforcing sheet 900 may contain chopped fiber mats. The fabric reinforcing sheet 900 may be a hybrid from different types of fibers, including a hybrid of glass fibers and carbon fibers. For ease in describing the embodiments herein, the embodiments will generally refer to the use of glass fibers, although it should be realized that various other fiber types may be used.

The fabric reinforcing sheet 900 includes a thermoplastic polymer material that is at least partially saturated or impregnated within the fabric material so that at least some of the fiber bundles are impregnated with the thermoplastic material. In some embodiments, the fabric reinforcing sheet 900 may be fully impregnated with the thermoplastic polymer material. For example, fabric reinforcing sheets that are manufactured according to the disclosures of the '034, '634, '007, and/or '307 application incorporated by reference herein and/or the '852 patent incorporated by reference herein may be used, which are fully impregnated with a thermoplastic polymer material. In such embodiments, the thermoplastic polymer material fully impregnates each fiber bundle of the fabric reinforcing sheet 900.

FIG. 9 illustrates a roll of the fabric reinforcing sheet 900. The fabric reinforcing sheet 900 may have a high content of reinforcing fibers. When the fabric reinforcing sheet 900 is subjected to a heating and/or pressure process, the thermoplastic polymer in the prepreg melts or softens to allow the fabric reinforcing sheet to be molded or formed into a composite part and/or to allow the prepreg to be bonded with other thermoplastic materials.

Since the fabric reinforcing sheet 900 is based on fabrics (often woven fabrics), the fiber distribution and orientation desired can be pre-built into the fabric design. Accordingly, the fabric reinforcing sheets 900 provide significantly higher design freedom and can be used to produce reinforced thermoplastic composite parts that are not attainable through conventional processes. A specific example of this advantage is provided in applications where longitudinal strength is needed. In such applications, the fabric reinforcing sheet 900 can be formed from fabrics with a required amount of fibers oriented along a longitudinal, or axial, direction of the desired end product.

An additional benefit is that the sizing of the fibers may be tailored for the in-situ polymerization of reactive monomers or oligomers to impart strong chemical bonding between the reinforcing fibers and the thermoplastic resin matrix. As such, a significant improvement in the composite property can be achieved.

Centrifugal Casting/Rotational Molding of Polymer-Based Composite Products Including Fabric Reinforcing Sheet A fabric reinforcing sheet 900 such as that shown in FIG. 9 may be positioned within the mold 202 (an example of which as shown in FIG. 4) during the casting. The fabric reinforcing sheet 900 is positioned within the mold 202 such that the fabric reinforcing sheet 900 is disposed within the radial wall of the polymerized end product 220. The fabric reinforcing sheet 900 may often be disposed within the mold 202 so that fabric reinforcing sheet 900 is adjacent to the inner wall of the mold 202. As such, the fabric reinforcing sheet 900 may often be disposed at or near the outer wall of the polymerized end product 220. In other instances, the fabric reinforcing sheet 900 may be positioned inwardly of the inner wall of the mold 202 so that the fabric reinforcing sheet 900 is at or adjacent to an inner wall of the polymerized end product 220. The fabric reinforcing sheet 900 may be disposed essentially anywhere within the wall of the polymerized end product 220.

In conventional centrifugally casted polymer products, a fabric cannot be disposed in a desired position within a wall of a casted polymer product. This is due to conventional fabric materials being too soft and flexible. Conventional fabric materials are "dry", meaning that the materials are not impregnated by, or otherwise include, a thermoplastic material. Rather, the conventional fabric materials are similar to typical cloth materials that include the woven fibers and essentially nothing else. These materials are not able to remain in position within the mold during the centrifugal casting processes. Rather, these fabric materials bunch up within the mold during the casting processes. As such, when conventional fabric materials are employed in centrifugal casting, the fabric is bunched up and/or isolated within the casted polymer product. As such, the casted polymer product is not effectively reinforced by the fabric and/or the reinforcement is non-uniform.

Figure 10A:
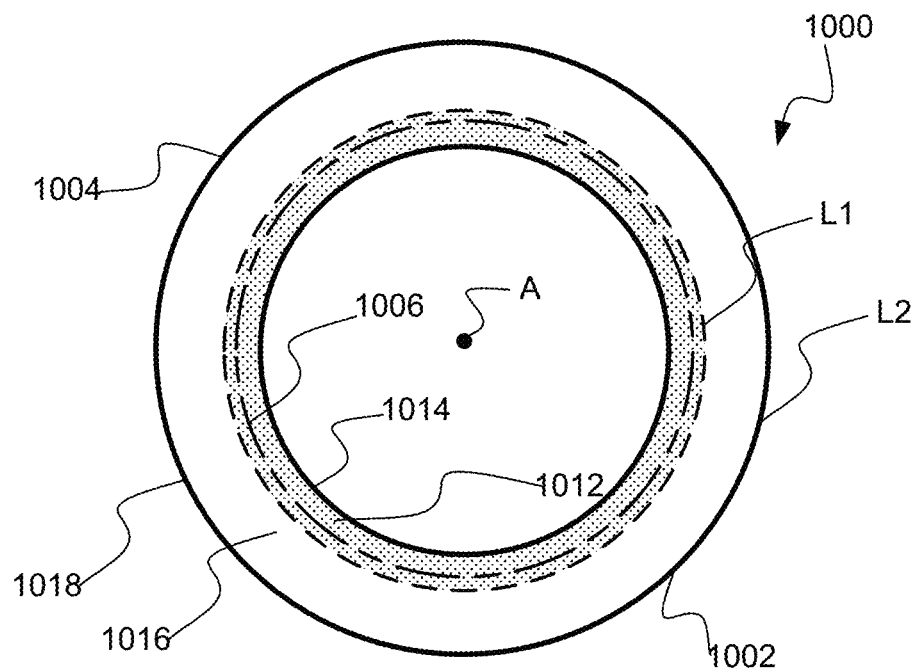
FIG. 10A illustrates a top view of a lightweight polymer-based composite product including a fabric reinforcing sheet that may be used in the processes and products described herein.
Figure 11:
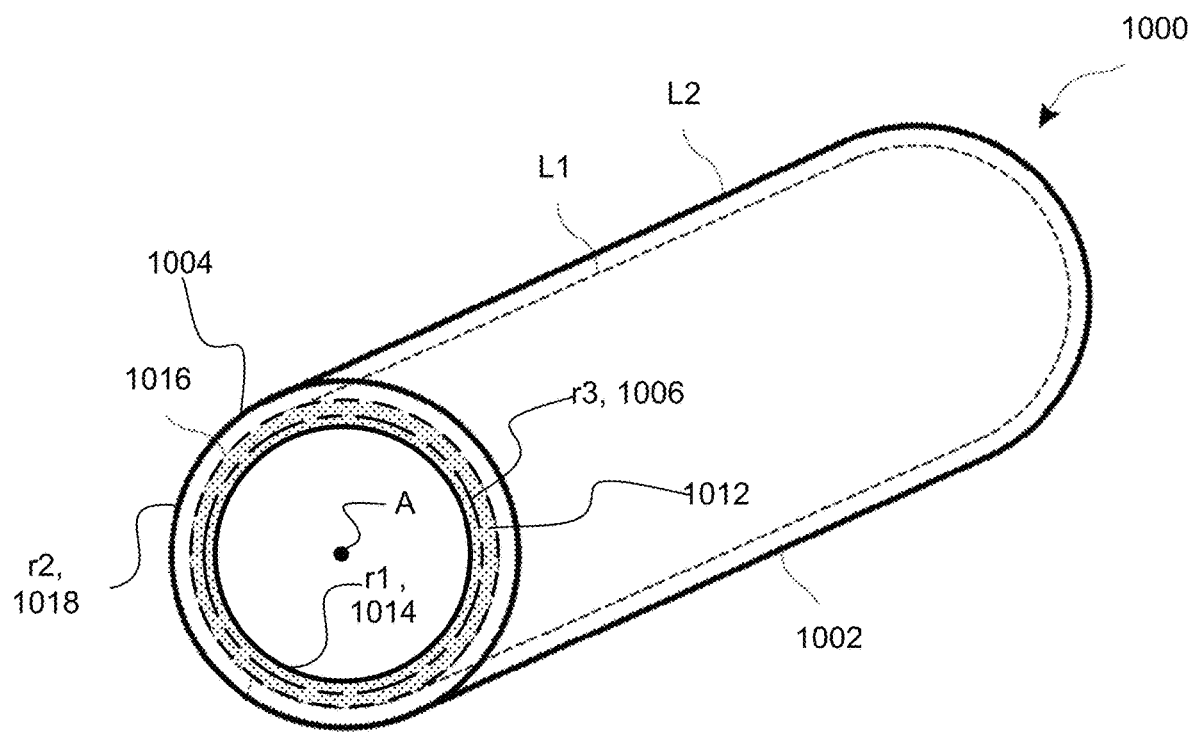
FIG. 11 illustrates a perspective view of the lightweight polymer-based composite product of FIG. 10A or FIG. 10B.

Referring now to FIG. 10A, illustrated is an embodiment of a lightweight polymer-based composite product 1000, which may be made of a thermoplastic material, and may include a fabric reinforcing sheet or thermoplastic prepreg 1006. The lightweight polymer-based composite product 1000 has a cylindrical shaped main body 1002 that is formed via centrifugal or rotational casting of a reactive thermoplastic resin within a mold. The cylindrical shaped main body 1002 has a hollow interior and a wall 1004 that is formed from in-situ polymerization of the reactive thermoplastic resin. The wall 1004 has an inner diameter and an outer diameter that define a wall thickness measured radially between the inner and outer diameter. The wall 1004 has an inner circumferential surface 1014 and an outer circumferential surface 1018 with a polymer 1016 there between. The lightweight polymer-based composite product 1000 includes a lightweight filler material 1012 and polymer 1016, which are similar to lightweight filler material and polymer as described with reference to FIGS. 1A-2 and 6-7B. The lightweight polymer-based composite product 1000 having inner and outer circumferential surfaces 1014 and 1018 are concentric about axis A. The lightweight polymer-based composite product 1000 may include a first layer L1 and a second layer L2; layers L1 and L2 may extend longitudinally as illustrated in FIG. 11. The first layer L1 may include the lightweight filler material 1012 embedded in the polymer 1016, and the second layer L2 includes the polymer 1016. The lightweight filler material 1012 that is embedded in the polymer 1016 may be concentrated on at least a portion of the inner circumferential surface 1014 to form layer L1. The lightweight polymer-based composite product 1000 may include a first layer L1 and a second layer L2, where layer L1 has a density less than layer L2.

Fabric reinforcing sheet or thermoplastic prepreg 1006 (also referred to herein as a pre-impregnated fabric reinforcing sheet) is positioned within the wall 1004 of the cylindrical shaped main body 1002. Fabric reinforcing sheet 1006 can be used in the rotational molds because the cured or polymerized thermoplastic material in the fabric reinforcing sheet 1006 provides rigidity and stiffness that allows the fabric reinforcing sheet to withstand the molding processes. As such, the fabric material does not bunch up within the rotational mold and instead remains relatively uniformly positioned within the rotational mold and within the resulting molded product.

As described herein, the fabric reinforcing sheet 1006 includes a plurality of fiber bundles. In some instances, the fiber bundles may be oriented along a first direction and a second direction with the second direction having an angled orientation relative to the first direction. In a specific embodiment, the first direction may be aligned with axis A of the cylindrical shaped main body 1002 and/or the second direction may be aligned circumferentially around the main body 1002. Other fiber orientations are likewise possible including a 30 degree, 45 degree, or 60 degree diagonal orientation of the fibers circumferentially along the main body 1002.

Figure 12:
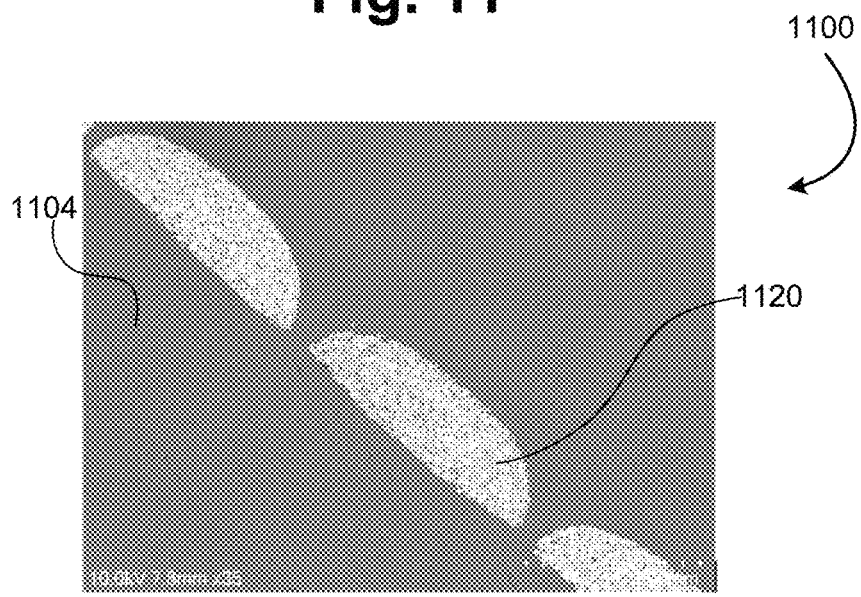
FIG. 12 illustrates a scanning electron microscopy (SEM) image of a fabric based reinforcing sheet disposed within a wall of the lightweight polymer-based composite product.

The fabric reinforcing sheet 1006 also includes a polymerized thermoplastic material that is impregnated within the plurality of fiber bundles. In a specific embodiment, the polymerized thermoplastic material is saturated within the fabric reinforcing sheet 1006 and fully impregnates each fiber bundle, or most fiber bundles, of the plurality of fiber bundles. For example, FIG. 12 illustrates a scanning electron microscopy (SEM) image of a cross section of a centrifugally casted component 1100. The image shows cross-section of fiber bundles 1120 in a fabric reinforcing sheet that is seamlessly integrated or disposed within a thick wall 1104 of the centrifugally casted component 1100. The image illustrates that the fiber bundles of the fabric reinforcing sheet 1006 are fully impregnated or wetted by the polymerized thermoplastic material. Stated differently, the image demonstrates that the fabric reinforcing sheet 1006 is substantially free of "dry fibers", or fibers that are not wetted or impregnated by the thermoplastic material.

In other embodiments, the thermoplastic material may partially impregnate the plurality of fiber bundles. In some embodiments, the process of polymerizing the reactive thermoplastic resin may be performed at a temperature which is below the melting temperature of the polymerized thermoplastic material in the fabric reinforcing sheet. For example, the anionic polymerization of caprolactam can be carried out at a temperature below the melting point of polyamide-6. In such instances, the caprolactam will polymerize without causing melting of the polyamide-6, which is coated on, and impregnated within, the fiber bundles in a polyamide-6 fabric reinforcing sheet. Therefore the rigidity of the fabric reinforcing sheet is kept during the centrifugal casting, and the fabric reinforcing sheet will not be bunched up like the conventional fabrics.

Even though the reactive thermoplastic resin may not impregnate the fiber bundles in the fabric reinforcing sheet, a seamless bond is created between the polymerized thermoplastic material of the fabric reinforcing sheet 1006 and the polymerized reactive thermoplastic resin that is used in the centrifugal casting process. The seamless bonding is typically due to the use of the same thermoplastic resin in the fabric reinforcing sheet 1006 and centrifugal casting. Cast component 1100 may be free of an interface between the fabric reinforcing sheet's polymerized thermoplastic material and the component wall's polymerized reactive thermoplastic resin that is centrifugally casted into contact with the fabric reinforcing sheet 1006. A seamless transition occurs between these two polymerize materials, which demonstrates the effective bonding of the materials. Additionally, a seamless transition may occur between these two polymerized materials and further between layers L1 and L2 as described above. While the fabric reinforcing sheet 1006, as shown in FIGS. 10A and 11, is disposed within the first layer L1 including lightweight filler material 1012 and polymer 1016; alternatively the fabric reinforcing sheet 1006 may be disposed within the second layer L2 or between the first layer L1 and the second layer L2. A seamless transition results in each instance (fabric reinforcing sheet 1006 within L1 or within L2 or between L1 and L2) due to the continuous matrix of polymer 1016 throughout L1 and L2 of wall 1004.

The fabric reinforcing sheet 1006 extends at least partially along an axial or longitudinal length of the cylindrical shaped main body 1002 and also extends circumferentially around the cylindrical shaped main body 1002. The fabric reinforcing sheet 1006 typically extends fully or entirely circumferentially around the main body 1002 as illustrated, although in some instances the fabric reinforcing sheet 1006 may extend only partially around the main body 1002 depending on the required application, or any other reason. The fabric reinforcing sheet 1006 forms a reinforcing layer within the wall 1004 of the cylindrical shaped main body 1002.

Figure 10B:
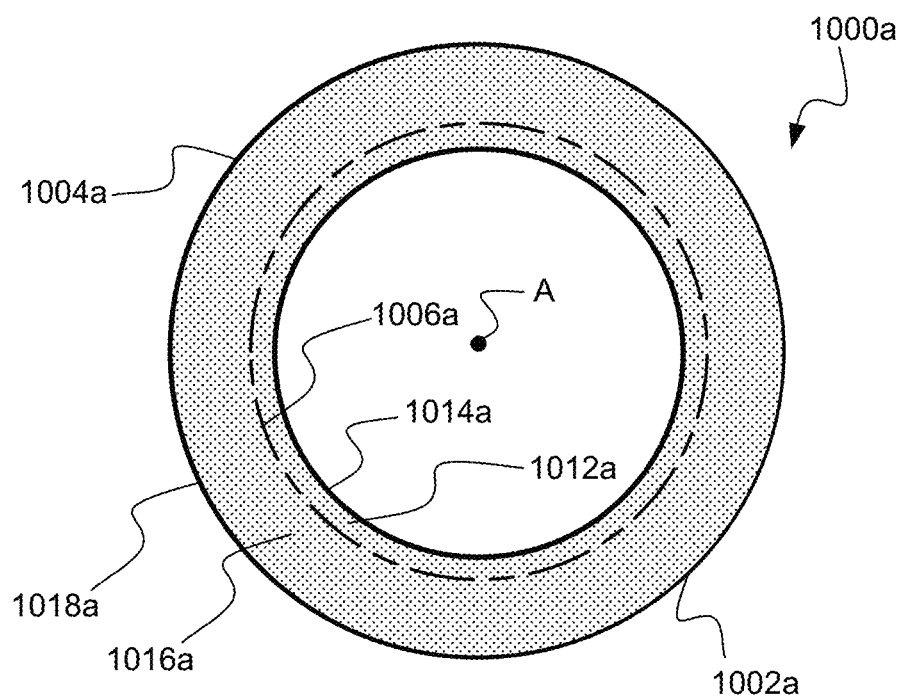
FIG. 10B illustrates a top view of another lightweight polymer-based composite product including a fabric reinforcing sheet that may be used in the processes and products described herein.

Referring now to FIG. 10B, illustrated is another embodiment of a lightweight polymer-based composite product 1000a, which may be made of a thermoplastic material, and may include a fabric reinforcing sheet or thermoplastic prepreg 1006a. The lightweight polymer-based composite product 1000a has a cylindrical shaped main body 1002a that is formed via centrifugal or rotational casting of a reactive thermoplastic resin within a mold. The cylindrical shaped main body 1002a has a hollow interior and a wall 1004a that is formed from in-situ polymerization of the reactive thermoplastic resin. The wall 1004a has an inner diameter and an outer diameter that define a wall thickness measured radially between the inner and outer diameter. The wall 1004a has an inner circumferential surface 1014a and an outer circumferential surface 1018a that are concentric about axis A. A polymer 1016a and lightweight filler material 1012a are positioned between the inner circumferential surface 1014a and an outer circumferential surface 1018a. The lightweight filler material 1012a and polymer 1016a are distributed homogeneously within the cylindrical shaped main body 1002a between the inner circumferential surface 1014a and an outer circumferential surface 1018a. The viscosity of the reactive resin is sufficiently high such that the lightweight filler material 1012a remains homogeneously mixed with the resin during liquid molding and resin curing. In some embodiments, the viscosity of the reactive resin may be at least 500 centipoises. The polymer 1016a is formed via in-situ polymerization of a reactive thermoplastic or thermoset resin as described herein.

The fabric reinforcing sheet 1006a is positioned within the wall 1004a of the cylindrical shaped main body 1002a. The fabric reinforcing sheet 1006a may have a composition and/or fiber orientation as described herein. A seamless bond is formed between the polymerized thermoplastic or thermoset material of the fabric reinforcing sheet 1006a and the polymerized reactive thermoplastic or thermoset resin that is used in the centrifugal casting process. The fabric reinforcing sheet 1006a extends at least partially along an axial or longitudinal length of the cylindrical shaped main body 1002a and also extends circumferentially around the cylindrical shaped main body 1002a. The fabric reinforcing sheet 1006a typically extends fully or entirely circumferentially around the main body 1002a as illustrated, although in some instances the fabric reinforcing sheet 1006a may extend only partially around the main body 1002a depending on the required application, or any other reason. The fabric reinforcing sheet 1006a forms a reinforcing layer within the wall 1004a of the cylindrical shaped main body 1002a.

As illustrated in FIG. 11, there is no significant bunching of the fabric reinforcing sheet 1006 within the wall 1004 of the cylindrical shaped main body 1002. For example, fabric reinforcing sheet 1006 does not include folded sections within the wall 1004 and/or around the periphery of the main body 1002. In some instances, a single layer of the fabric reinforcing sheet 1006 may be disposed within the wall 1004 of the cylindrical shaped main body 1002 while in other instances, multiple layers of the fabric reinforcing sheet 1006 may be disposed within the wall 1004. The image illustrated in FIG. 11 may be representative of the lightweight polymer-based composite product of FIG. 10A or 10B. For convenience in describing the embodiment, FIG. 11 will mainly reference the lightweight polymer-based composite product of FIG. 10A.

As illustrated in FIG. 11, the fabric reinforcing sheet 1006 may be disposed substantially or roughly concentrically within the wall 1004 of the main body 1002. Stated differently, an axis A of the fabric reinforcing sheet 1006 may be aligned or concentric with an axis of the main body 1002. In other instances, the fabric reinforcing sheet 1006 may be disposed within the wall so as to have a non-concentric arrangement.

The fabric reinforcing sheet 1006 may also be disposed radially inward from the outer wall or surface of the cylindrical shaped main body 1002. Specifically, the wall 1004 has an inner wall or surface that is defined by a first radius $r_1$ and an outer wall or surface that is defined by a second radius $r_2$. The fabric reinforcing sheet 1006 is disposed within the wall 1004 and has a radius $r_3$. The radius $r_3$ of the fabric reinforcing sheet 1006 may be equivalent with either $r_1$ or $r_2$, such that the fabric reinforcing sheet 1006 is essentially disposed on the inner or outer surface of the main body 1002, respectively, or the radius $r_3$ may be between $r_1$ or $r_2$ so that the fabric reinforcing sheet 1006 is disposed within the wall 1004 between the inner and outer wall surfaces 1014 and 1018, respectively.

In some instances, the fabric reinforcing sheet 1006 is positioned within the wall 1004 so that the fabric reinforcing sheet 1006 is axially shorter than a length of the cylindrical shaped main body 1002. Because the fabric reinforcing sheet 1006 may have a length shorter than the main body's length, the fabric reinforcing sheet 1006 may be disposed within the main body 1002 so that at least one axial end or edge of the fabric reinforcing sheet 1006 is positioned axially inward of an axial end or edge of the main body 1002. In some embodiments, both axial ends of the fabric reinforcing sheet 1006 may be positioned axially inward of the respective axial ends of the main body 1002.

This axial shorter arrangement of the fabric reinforcing sheet 1006 may be achieved by positioning the fabric reinforcing sheet 1006 within the rotational mold with one or both axial ends of the fabric reinforcing sheet 1006 positioned axially inward of the axial ends of the mold. Stated differently, the fabric reinforcing sheet 1006 may be positioned within the mold so that a gap or clearance exists between one or more lateral edges of the prepreg component and the mold. This axial shorter configuration may aid in forming the reinforced polymer product 1000 by allowing the reactive thermoplastic resin material to flow axially around the fabric reinforcing sheet 1006. For example, the fabric reinforcing sheet 1006 may function as a barrier that impedes or prevents the radial flow or movement of the reactive resin material within the mold. With the fabric reinforcing sheet 1006 positioned within the mold so that one or both axial ends are axially inward of the mold ends, the reactive resin material is able to flow around the axial ends of the fabric reinforcing sheet 1006 and behind the fabric reinforcing sheet 1006.

In some embodiments, the fabric reinforcing sheet 1006 may include one or more sections that aid in the radial flow of the reactive resin material within the mold. For example, the fabric reinforcing sheet 1006 may include one or more holes (not shown) that allow the reactive resin material to flow through the fabric reinforcing sheet 1006 during rotational molding. In embodiments that employ sections that aid in radial flow of the reactive resin material through the fabric reinforcing sheet 1006, the fabric reinforcing sheet 1006 may be positioned within the mold and the resulting reinforced polymer product 1000 with the opposing axial ends roughly aligned with the opposing ends of the mold and the resulting reinforced polymer product 1000.

Although the main body 1002 is illustrated in FIG. 11 as having a smooth cylindrical inner and/or outer wall configuration, it should be realized that in many embodiments the inner and/or outer wall of the main body 1002 will include various non-cylindrical or smooth configurations. For example, the inner and/or outer wall may include various projections, teeth, flanges, ribs, recesses, and the like. In addition, the opposing axial ends of the main body 1002 may include flanges, ribs, teeth, and the like that aid in coupling adjacent sections of tubing and/or serve various other purposes.

In an exemplary embodiment, a fully-impregnated polyamide-6 fabric reinforcing sheet may be used as a reinforcement component in a caprolactam rotational molding process, where the process further includes a lightweight filler material. The resulting product is a lightweight, reinforced polyamide-6 part. In a liquid molding process with caprolactam, the molding temperature is typically the polymerization temperature of caprolactam (e.g., 160° C.), which is well below the melting temperature of the polyamide-6 material in the fabric reinforcing sheet. As a result, the net shape of the fabric reinforcing sheet is preserved during the molding process, which ensures that the desired fiber orientation and fiber distribution in the molded parts is maintained.

The full impregnation of the reinforcing fibers in the polyamide-6 fabric reinforcing sheet also eliminates the need for additional resin impregnation of reinforcing fibers during the molding process. The full impregnation of the fabric reinforcing sheet further ensures the molded part is free of, or otherwise does not include, dry fibers (i.e., fibers which are not wetted or contacted by the thermoplastic material), which may cause degradation in mechanical properties of the molded part. An additional advantage of using polyamide-6 fabric reinforcing sheet as the reinforcement for thermoplastic liquid molding of caprolactam is the seamless integration of polyamide-6 in the fabric reinforcing sheet and the in-situ polymerized polyamide-6 from liquid molding.

In some embodiments, a fully impregnated thermoplastic fabric reinforcing sheet can be positioned inside a mold prior to injection of a reactive thermoplastic resin within the mold, such as in a resin transfer molding (RTM) process. The use of the thermoplastic fabric reinforcing sheet provides several advantages over conventional fabric reinforcement. For example, the thermoplastic fabric reinforcing sheet may be formed into rather complex three dimensional shapes and inserted into a mold, prior to injection of reactive thermoplastic resin onto the fabric reinforcing sheet. The additionally injected resin may form additional and/or more complex shapes, and/or may increase the thickness of the polymer material in the product. The thermoplastic fabric reinforcing sheet also provides structural integrity to the fiber bundles to ensure that the fibers do not displace during injection of the resin. The non-displacement of the fibers during injection ensures that the final product is properly reinforced in desired and/or critical areas.

Forming conventional fabric sheets (i.e., fabric sheets that are not impregnated with thermoplastic material) into complex three dimensional shapes for a subsequent resin injection process is difficult due to the flexibility of the fabric material and due to the ability of the individual fibers to move or displace during injection of the resin. For example, a common problem associated with RTM products is that the fabric material experiences fiber displacement during resin injection. Specifically, since the resin is injected under pressure, the pressurized resin causes the fibers to move or displace outwardly from the injection point. The displacement of the fibers may create areas of weakness or non-uniformity within the resulting product.

To counter this problem, a binder material may be employed on the fabric material to pre-form the fabric material into a net shape. The binder adheres to the fiber bundles together and functions to hold or maintain the fiber bundles in position during injection of the resin. This solution, however, results in various other issues or problems. For instance, when caprolactam is used as the reactive thermoplastic resin, the extreme sensitivity of the anionic polymerization of caprolactam to environmental conditions may result in incomplete polymerization of the caprolactam if an incompatible binder is used. As a result, the use of caprolactam greatly reduces the choices of binder materials that may be employed to adhere the fiber bundles together. In addition, the use of the binder material may form a weak interface or boundary between the binder material and the polymerized resin. The formed product is typically weakest where such interfaces or boundaries are formed.

The thermoplastic fabric reinforcing sheet described herein eliminate these problems associated with resin injection processes. For example, the polymerized resin in the thermoplastic fabric reinforcing sheet functions to maintain the fiber bundles in position during the injection of the resin, thereby eliminating the need to use binder materials in the reinforcing fabrics. The polymerized resin of the thermoplastic fabric reinforcing sheet prevents fiber displacement during the injection process, especially in instances where the resin is injected and polymerized below the melting temperature of the thermoplastic material in the fabric reinforcing sheet.

In addition, the polymerized resin of the thermoplastic fabric reinforcing sheet may be the same as the polymerized resin formed from the reactive thermoplastic resin that is injected into the mold. Since the thermoplastic materials are of the same nature, an interface or boundary between the two materials is not formed. In some instances, the injected reactive thermoplastic resin may soften or partially melt the fabric reinforcing sheet's thermoplastic material. In such instances, the injected reactive thermoplastic resin may mix and/or bond with the thermoplastic material of the fabric reinforcing sheet.

The embodiments described herein may find particular usefulness in RTM processes that involve a preformed component having a desired shape. For example, a sheet of the thermoplastic fabric reinforcing sheet may be thermoformed into a desired shape, such as an oil pan. The thermoformed fabric reinforcing sheet may then be positioned within an RTM mold and a reactive thermoplastic resin may be injected onto the thermoformed fabric reinforcing sheet. The resulting product is a fiber reinforced RTM product having improved strength and uniformity due to elimination of fiber displacement, weak interfaces, and the like. The thermoformed fabric reinforcing sheet may form a portion of the entire final RTM product.

Figure 13:
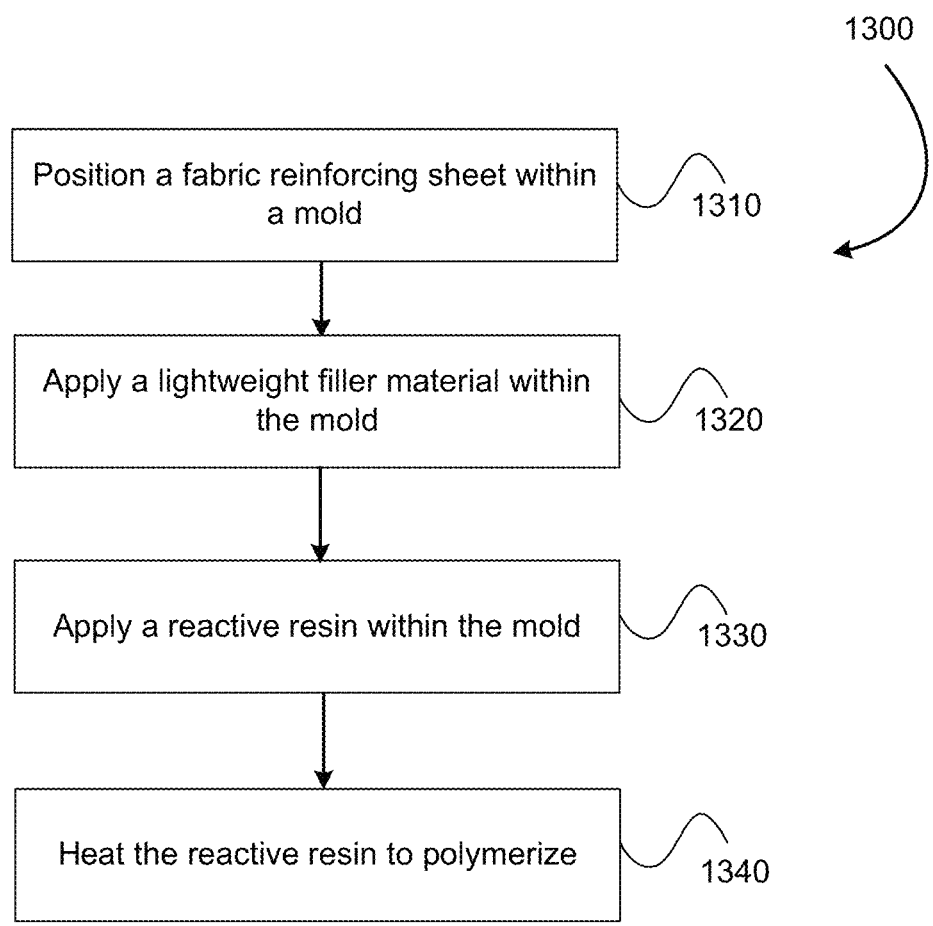
FIG. 13 illustrates a method of forming a lightweight thermoplastic polymer-based composite product.

Referring now to FIG. 13, illustrated is a method 1300 of reinforcing a thermoplastic product. At block 1310, a fabric reinforcing sheet is positioned within a mold. In some instances, the mold may be a mold associated with a resin injection process, such as a mold used in resin transfer molding. In other instances, the mold may be a centrifugal casting mold. In the centrifugal casting example, the fabric reinforcing sheet may be positioned within the mold so that the fabric reinforcing sheet extends longitudinally along at least a portion of the centrifugal casting mold and circumferentially around an axis of the centrifugal casting mold.

In either instance, the fabric reinforcing sheet may include a plurality of first fiber bundles that are oriented along a first direction and a polymerized thermoplastic material that is partially or fully impregnated within the plurality of fiber bundles. In some instances, the fabric reinforcing sheet may also include a plurality of second fiber bundles that are oriented along a second direction having an angled orientation relative to the first direction. The polymerized thermoplastic material may be partially or fully impregnated within the plurality of second fiber bundles.

At block 1320, a lightweight filler material is applied to a mold cavity in a manner as similarly described for block 610 of FIG. 8. The lightweight filler material may have a density of between 0.1 and 1.0 g/cm$^3$. In some embodiments, the lightweight filler material may be applied at the same time, and/or in a mixture with the reactive resin at block 1330.

At block 1330, a reactive thermoplastic resin is injected within the mold. In the resin injection embodiments, the reactive thermoplastic resin may be injected atop the fabric reinforcing sheet. In the centrifugal casting embodiments, the reactive thermoplastic resin may be injected so that the reactive thermoplastic resin is centrifugally forced outward within the mold into contact with the fabric reinforcing sheet and an inside wall of the centrifugal casting mold. In either embodiment, the reactive thermoplastic resin may include caprolactam, laurolactam, methyl methacrylate (MMA), cyclic butylene terephthalate (CBT), reactive components of thermoplastic polyurethane (TPU), cyclic alkenes, or some combination thereof.

At block 1340, the reactive thermoplastic resin is in-situ polymerized so that the polymerized reactive thermoplastic resin solidifies within the mold. In the centrifugal casting embodiments, the polymerized reactive thermoplastic resin is solidified with the fabric reinforcing sheet disposed within a cylindrical wall of the thermoplastic product and circumferentially around an axis of the thermoplastic product. In either embodiment, the polymerization of the reactive thermoplastic resin may be performed at a temperature below the melting point of the fabric reinforcing sheet's thermoplastic material. For example, the anionic polymerization of caprolactam can be carried out at a temperature below the melting point of polyamide-6. As such, the fabric reinforcing sheet's thermoplastic material may experience minimal or no substantial softening or melting of the thermoplastic material.

In the centrifugal casting embodiments, the fabric reinforcing sheet may be positioned within the centrifugal casting mold so that a gap exists between opposing axial ends of the fabric reinforcing sheet and opposing axial ends of the centrifugal casting mold. The gap may enable flow of the reactive thermoplastic resin around the opposing axial ends of the fabric reinforcing sheet. The fabric reinforcing sheet may also be disposed radially inward from an outer wall of the thermoplastic product.

Having described several embodiments, it will be recognized by those of skill in the art that various modifications, alternative constructions, and equivalents may be used without departing from the spirit of the invention. Additionally, a number of well-known processes and elements have not been described in order to avoid unnecessarily obscuring the present invention. Accordingly, the above description should not be taken as limiting the scope of the invention.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included.

As used herein and in the appended claims, the singular forms "a", "an", and "the" include plural referents unless the context clearly dictates otherwise. Thus, for example, reference to "a process" includes a plurality of such processes and reference to "the device" includes reference to one or more devices and equivalents thereof known to those skilled in the art, and so forth.

Also, the words "comprise," "comprising," "include," "including," and "includes" when used in this specification and in the following claims are intended to specify the presence of stated features, integers, components, or steps, but they do not preclude the presence or addition of one or more other features, integers, components, steps, acts, or groups.

What is claimed is:

1. A lightweight polymer-based composite product comprising:
    a first layer having a first exterior surface, the first layer comprising:
        a polymer material body formed of an in-situ polymerized polymer having a density of at least 1.0 g/cm3; and
        a lightweight filler material that is embedded in the polymer, wherein the lightweight filler material has a density of between 0.1 and 1.0 g/cm3;
    a second layer having a second exterior surface that is positioned opposite the first exterior surface, the second layer comprising a polymer material body formed of the in-situ polymerized polymer;
    wherein the lightweight filler material is separated from the second layer such that substantially all of the lightweight filler material is included in the first layer;
    wherein the first exterior surface includes the lightweight filler material and the second exterior surface is free of the lightweight filler material;
    wherein the second layer seamlessly transitions from the first layer due to a continuous matrix of the in-situ polymerized polymer throughout the first layer and the second layer; and wherein the first layer has a density that is less than the second layer.

2. The lightweight polymer-based composite product of claim 1, wherein the polymer of the polymer material body comprises a thermoplastic material.

3. The lightweight polymer-based composite product of claim 2, wherein the polymer consists of nylon, polymethyl methacrylate (PMMA), polybutylene terephthalate (PBT), thermoplastic polyurethane (TPU), or mixtures thereof.

4. The lightweight polymer-based composite product of claim 1, wherein the polymer-based composite product has a thermal conductivity that is lower than a comparable product consisting essentially of the polymer.

5. The lightweight polymer-based composite product of claim 1, wherein the polymer-based composite product exhibits a compression strength that is greater than a comparable product consisting essentially of the polymer.

6. The lightweight polymer-based composite product of claim 1, wherein the lightweight filler material consists of hollow glass microspheres.

7. The lightweight polymer-based composite product of claim 1, wherein the first layer includes between 50 and 99 weight percent of the polymerized polymer.

8. The lightweight polymer-based composite product of claim 1, wherein the first layer includes between 1 and 50 weight percent of the lightweight filler material.

9. The lightweight polymer-based composite product of claim 1, further comprising a pre-impregnated fabric reinforcing sheet that is positioned within the polymer-based composite product so that the pre-impregnated fabric reinforcing sheet extends at least partially along a longitudinal length of the polymer-based composite product, the pre-impregnated fabric reinforcing sheet including a plurality of fiber bundles that are oriented along a first direction and a second direction, the second direction having an angled orientation relative to the first direction, wherein the pre-impregnated fabric reinforcing sheet includes a thermoplastic polymer that saturates or impregnates each fiber bundle of the plurality of fiber bundles.

10. The lightweight polymer-based composite product of claim 1, wherein the lightweight filler material includes a coating that increases an interfacial bond between the lightweight filler material and the polymer.

11. The lightweight polymer-based composite product of claim 1, wherein the first layer includes between 3 and 50 percent by volume of the lightweight filler material.

12. The lightweight polymer-based composite product of claim 1, wherein the polymer-based composite product is a cylindrical shaped product and wherein the first layer is positioned on an interior surface of the cylindrical shaped product.

13. The lightweight polymer-based composite product of claim 1, wherein the lightweight filler material is homogenously dispersed within the polymer material body of the first layer.

14. A lightweight polymer-based composite product comprising:
   a polymer material body formed of an in-situ polymerized polymer, the polymer material body having a first exterior surface and a second exterior surface that is positioned opposite the first exterior surface and the polymer having a density of at least 1.0 g/cm3; and
   a lightweight filler material that is embedded in the polymer and that is concentrated within the polymer material body so that the lightweight filler material forms a layer on at least a portion of the first exterior surface of the polymer material body and so that the second exterior surface is free of the lightweight filler material;
   wherein the lightweight filler material has a density of between 0.1 and 1.0 g/cm3.

15. The lightweight polymer-based composite product of claim 14, wherein the polymer of the polymer material body comprises a thermoplastic material.

16. The lightweight polymer-based composite product of claim 15, wherein the polymer consists of nylon, polymethyl methacrylate (PMMA), polybutylene terephthalate (PBT), thermoplastic polyurethane (TPU), or mixtures thereof.

17. The lightweight polymer-based composite product of claim 14, wherein the polymer-based composite product has a thermal conductivity that is lower than a comparable product consisting essentially of the polymer.

18. The lightweight polymer-based composite product of claim 14, wherein the polymer-based composite product exhibits a compression strength that is greater than a comparable product consisting essentially of the polymer.

19. The lightweight polymer-based composite product of claim 14, wherein the lightweight filler material consists of hollow glass microspheres.

20. The lightweight polymer-based composite product of claim 14, wherein the polymer-based composite product includes between 50 and 99 weight percent of the polymerized reactive resin.

21. The lightweight polymer-based composite product of claim 14, wherein the polymer-based composite product includes between 1 and 50 weight percent of the lightweight filler material.

22. The lightweight polymer-based composite product of claim 14, further comprising a fabric reinforcing sheet that is disposed within the polymer material body, the fabric reinforcing sheet including a plurality of fibers that are saturated or impregnated with the polymer.

23. The lightweight polymer-based composite product of claim 22, wherein the fabric reinforcing sheet includes a plurality of first fiber bundles that are oriented along a first direction and a plurality of second fiber bundles that are oriented along a second direction, the second direction having an angled orientation relative to the first direction, and wherein the polymer saturates or impregnates each fiber bundle of the plurality of first fiber bundles and second fiber bundles.

24. The lightweight polymer-based composite product of claim 22, wherein the fabric reinforcing sheet includes nonwoven randomly oriented fibers, and wherein the polymer saturates or impregnates each fiber of the nonwoven randomly oriented fibers.

* * * * *